United States Patent
Nakagawa

(10) Patent No.: US 8,147,152 B2
(45) Date of Patent: Apr. 3, 2012

(54) IMAGE SENSING APPARATUS AND CONTROL METHOD THEREOF

(75) Inventor: Kazuyuki Nakagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/852,587

(22) Filed: Aug. 9, 2010

(65) Prior Publication Data

US 2011/0052184 A1    Mar. 3, 2011

(30) Foreign Application Priority Data

Aug. 31, 2009   (JP) .................. 2009-201082

(51) Int. Cl.
G03B 17/38    (2006.01)
G03B 9/40    (2006.01)
H04N 5/238    (2006.01)

(52) U.S. Cl. .................. 396/502; 396/489; 348/363

(58) Field of Classification Search .................. 396/502, 396/483–489; 348/363

See application file for complete search history.

(56) References Cited

U.S. PATENT DOCUMENTS 4,881,092 A * 11/1989 Fukahori et al. .............. 396/357
6,179,493 B1    1/2001 Murashima et al.

FOREIGN PATENT DOCUMENTS

JP    2765747    4/1998
JP    2000-089358    3/2000

* cited by examiner

*Primary Examiner* — Rochelle-Ann J Blackman
(74) *Attorney, Agent, or Firm* — Cowan, Liebowitz & Latman, P.C.

(57) ABSTRACT

An image sensing apparatus comprises a shutter driving member which drives a shutter blade; a shutter spring which urges the shutter driving member; a shutter charge unit which charges the shutter spring, and is switched between an over-charged state and a travel prepared state; a driving unit which drives the shutter charge unit; a retaining unit which, when the shutter charge unit is set in the travel prepared state, retains the shutter driving member in a state in which the shutter spring is charged; a determination unit which determines whether or not the apparatus is executing a continuous shooting operation; and a controller which, when it is determined that the apparatus is executing the continuous shooting operation, controls to drive the shutter charge unit to the travel prepared state without stopping the shutter charge unit in the over-charged state after the charge operation of the shutter spring is complete.

14 Claims, 28 Drawing Sheets

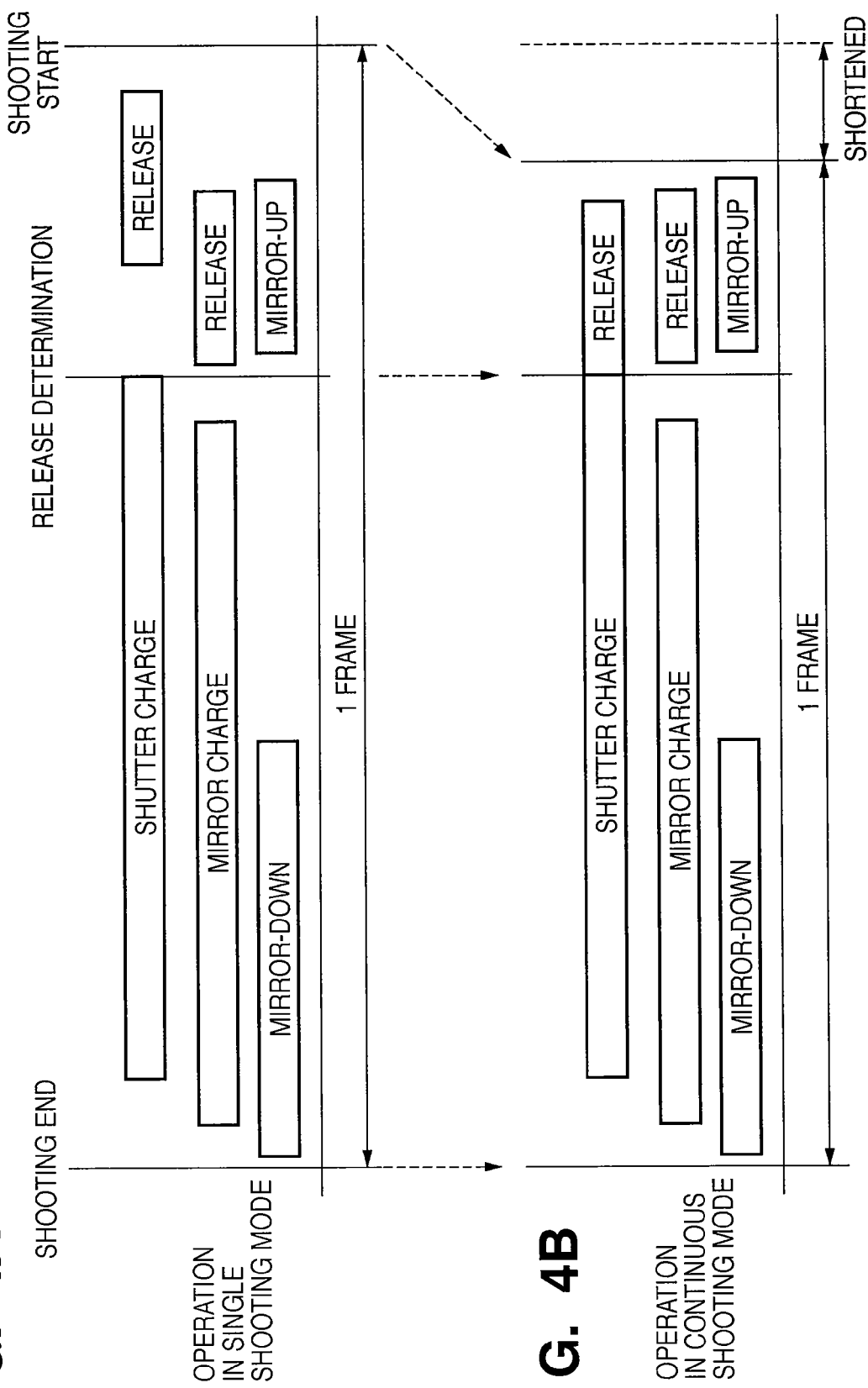

F I G. 6A
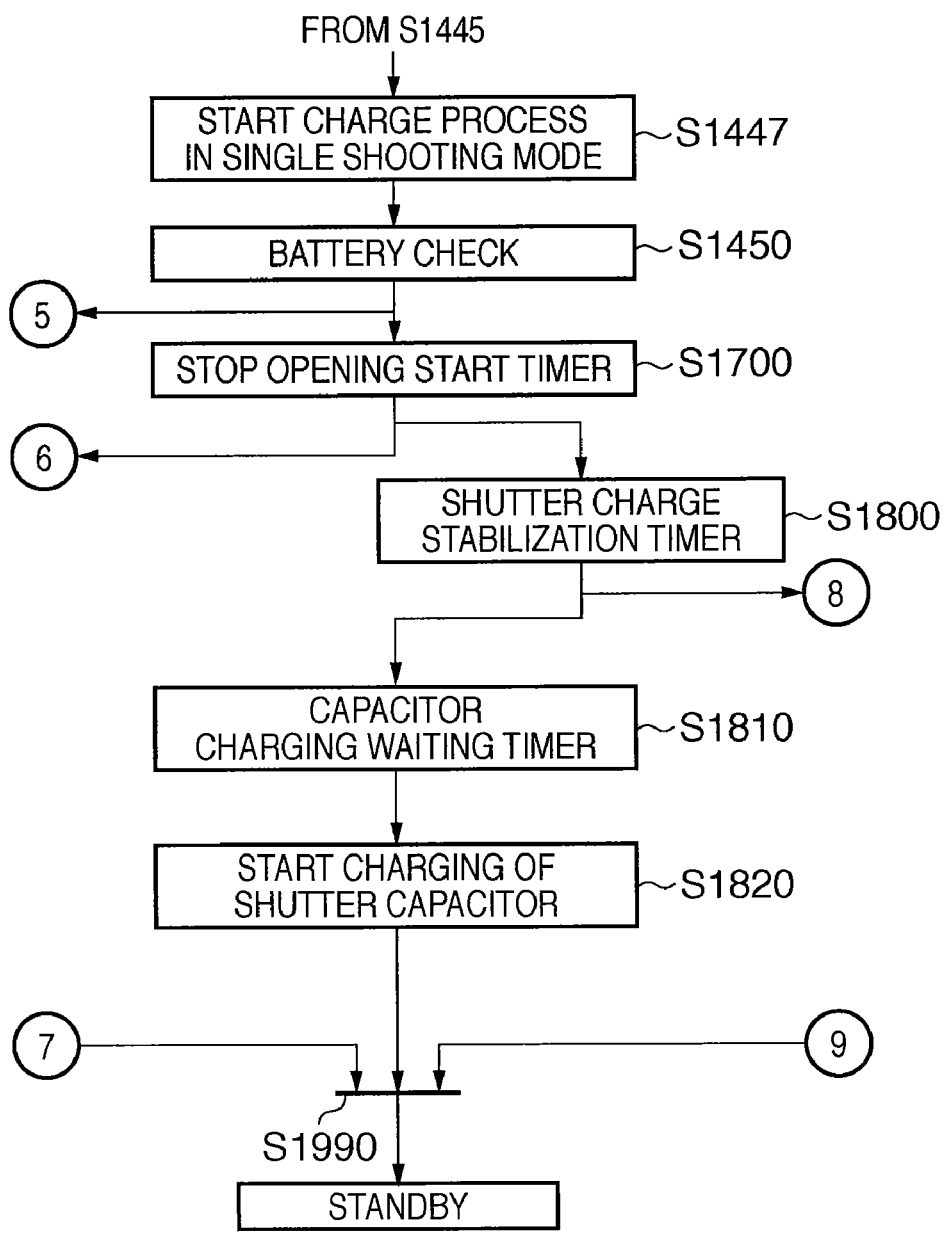

IMAGE SENSING APPARATUS AND CONTROL METHOD THEREOF

BACKGROUND OF THE INVENTION

1. Field of the Invention

The present invention relates to an image sensing apparatus and control method of the image sensing apparatus, particularly to a shutter control of an image sensing apparatus.

2. Description of the Related Art

Conventionally, an arrangement, which retains a shutter blade by a shutter latch mechanism after a charge operation of a shutter device is completed by a shutter charge mechanism, and stops the shutter charge mechanism in a travel prepared state in which the charged state by the shutter charge mechanism is released, is known. As another arrangement, after the charge operation by the shutter charge mechanism is completed, the shutter charge mechanism is stopped in the charged state to retain the shutter blade. Then, the shutter charge mechanism is shifted from the charged state to the travel prepared state interlockingly with a shutter release operation, thus attaining a shooting operation.

Japanese Patent Laid-Open No. 2000-089358 describes an arrangement which includes a mirror, stop, and unit for charging a shutter, and performs an exposure preparation operation without waiting for completion of the charge operation of the shutter when the charged states of the mirror and stop are detected in a continuous shooting mode. Japanese Patent No. 2765747 describes an arrangement that retains a latch lever by pressing it by a retaining lever against an armature after a shutter charge operation, and externally releases a body release lever that retains the retaining lever before shutter traveling. In this arrangement, the mirror is retracted to a position outside a shooting optical path, and the body release lever is released interlockingly with retraction of the mirror.

However, in the arrangement which stops the shutter charge mechanism in the travel prepared state in which the charged state is released, the operation characteristic of the shutter device is likely to change, since a vibration or shock acts in a nonuse state of the image sensing apparatus or after an elapse of a long term. When the vibration or shock is large, the latched state of the shutter blade is released, and the shutter blade may travel. In the arrangement which retains the shutter blade while stopping the shutter charge mechanism in the charged state, when the shutter blade is traveled in response to the shutter release operation, the shutter charge mechanism is required to be shifted from the charged state to the travel prepared state. For this reason, two operations are required upon shooting one frame, and a shooting time per frame is prolonged.

According to Japanese Patent Laid-Open No. 2000-089358 above, the shutter charge mechanism is always driven to the travel prepared state after the charge operation is completed. For this reason, an operation after the image sensing apparatus is left in a nonuse state for a long term becomes unstable, or the latched state of the shutter blade may be released and may travel upon acting a vibration or shock. Furthermore, in Japanese Patent No. 2765747, since the mirror is in the retracted state when the continuous shooting operation is stopped, the shutter has to be re-charged and the latch mechanism has to be retained by the retaining lever after the mirror returns.

SUMMARY OF THE INVENTION

The present invention has been made in consideration of the aforementioned problems, and realizes an image sensing apparatus, which can improve the reliability of inadvertent shutter traveling in a nonuse state and the operation stability of a shutter device after it is left unused for a long term, and can shorten a shooting time per frame.

In order to solve the aforementioned problems, the present invention provides an image sensing apparatus which is capable of executing a continuous shooting operation, comprising: a shutter driving member which drives a shutter blade; a shutter spring which urges the shutter driving member; a shutter charge unit which charges the shutter spring, the shutter charge unit being switched between an over-charged state in which the shutter driving member is retained while the shutter spring is over-charged after a charge operation of the charge spring is complete, and a travel prepared state in which the over-charged state is released; a driving unit which drives the shutter charge unit; a retaining unit which, when the shutter charge unit is set in the travel prepared state, retains the shutter driving member in a state in which the shutter spring is charged; a determination unit which determines whether or not the image sensing apparatus is executing the continuous shooting operation; and a control unit which, when the determination unit determines that the image sensing apparatus is executing the continuous shooting operation, controls the driving unit to drive the shutter charge unit to the travel prepared state without stopping the shutter charge unit in the over-charged state after the charge operation of the shutter spring is complete.

The present invention provides an image sensing apparatus, which comprises a continuous shooting mode in which a shooting operation is continuously executed while a switch used to instruct to start the shooting operation is kept ON, the apparatus comprising: a shutter driving member which drives a shutter blade; a shutter spring which urges the shutter driving member; a shutter charge unit which charges the shutter spring, the shutter charge unit being switched between an over-charged state in which the shutter driving member is retained while the shutter spring is over-charged after a charge operation of the charge spring is complete, and a travel prepared state in which the over-charged state is released; a driving unit which drives the shutter charge unit; a retaining unit which, when the shutter charge unit is set in the travel prepared state, retains the shutter driving member in a state in which the shutter spring is charged; a first determination unit which determines whether or not the continuous shooting mode is set; a second determination unit which determines whether or not the switch is ON; and a control unit which, when the first determination unit determines that the continuous shooting mode is set, and the second determination unit determines that the switch is ON, controls the driving unit to drive the shutter charge unit to the travel prepared state without stopping the shutter charge unit in the over-charged state after the charge operation of the shutter spring is complete.

The present invention provides a control method of an image sensing apparatus which is capable of executing a continuous shooting operation, comprising: a shutter driving member which drives a shutter blade; a shutter spring which urges the shutter driving member; a shutter charge unit which charges the shutter spring, the shutter charge unit being switched between an over-charged state in which the shutter driving member is retained while the shutter spring is over-charged after a charge operation of the charge spring is complete, and a travel prepared state in which the over-charged state is released; a driving unit which drives the shutter charge unit; and a retaining unit which, when the shutter charge unit is set in the travel prepared state, retain the shutter driving member in a state in which the shutter spring is charged, the method comprising: a determination step of determining whether or not the image sensing apparatus is executing the continuous shooting operation; and a control step of controlling, when it is determined in the determination step that the image sensing apparatus is executing the continuous shooting operation, the driving unit to drive the shutter charge unit to the travel prepared state without stopping the shutter charge unit in the over-charged state after the charge operation of the shutter spring is complete.

The present invention provides a control method of an image sensing apparatus, which comprises a continuous shooting mode in which a shooting operation is continuously executed while a switch used to instruct to start the shooting operation is kept ON, comprising: a shutter driving member which drives a shutter blade; a shutter spring which urges the shutter driving member; a shutter charge unit which charges the shutter spring, the shutter charge unit being switched between an over-charged state in which the shutter driving member is retained while the shutter spring is over-charged after a charge operation of the charge spring is complete, and a travel prepared state in which the over-charged state is released; a driving unit which drives the shutter charge unit; and a retaining unit which, when the shutter charge unit is set in the travel prepared state, retains the shutter driving member in a state in which the shutter spring is charged, the method comprising: a first determination step of determining whether or not the continuous shooting mode is set; a second determination step of determining whether or not the switch is ON; and a control step of controlling, when it is determined in the first determination step that the continuous shooting mode is set, and it is determined in the second determination step that the switch is ON, the driving unit to drive the shutter charge unit to the travel prepared state without stopping the shutter charge unit in the over-charged state after the charge operation of the shutter spring is complete.

According to the present invention, the reliability of inadvertent shutter traveling in a nonuse state and the operation stability of a shutter device after it is left unused for a long term can be improved, and a shooting time per frame can be shortened.

Further features of the present invention will become apparent from the following description of exemplary embodiments (with reference to the attached drawings).

BRIEF DESCRIPTION OF THE DRAWINGS

FIGS. 4A and 4B are charts showing the relationship between a shutter charge time and mirror charge time;

FIGS. 6A to 6C are flowcharts showing operations from the shutter release operation until the exposure operation of the image sensing apparatus according to the first embodiment;

DESCRIPTION OF THE EMBODIMENTS

Embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention should not be limited to the following embodiments.

First Embodiment

Figure 1:
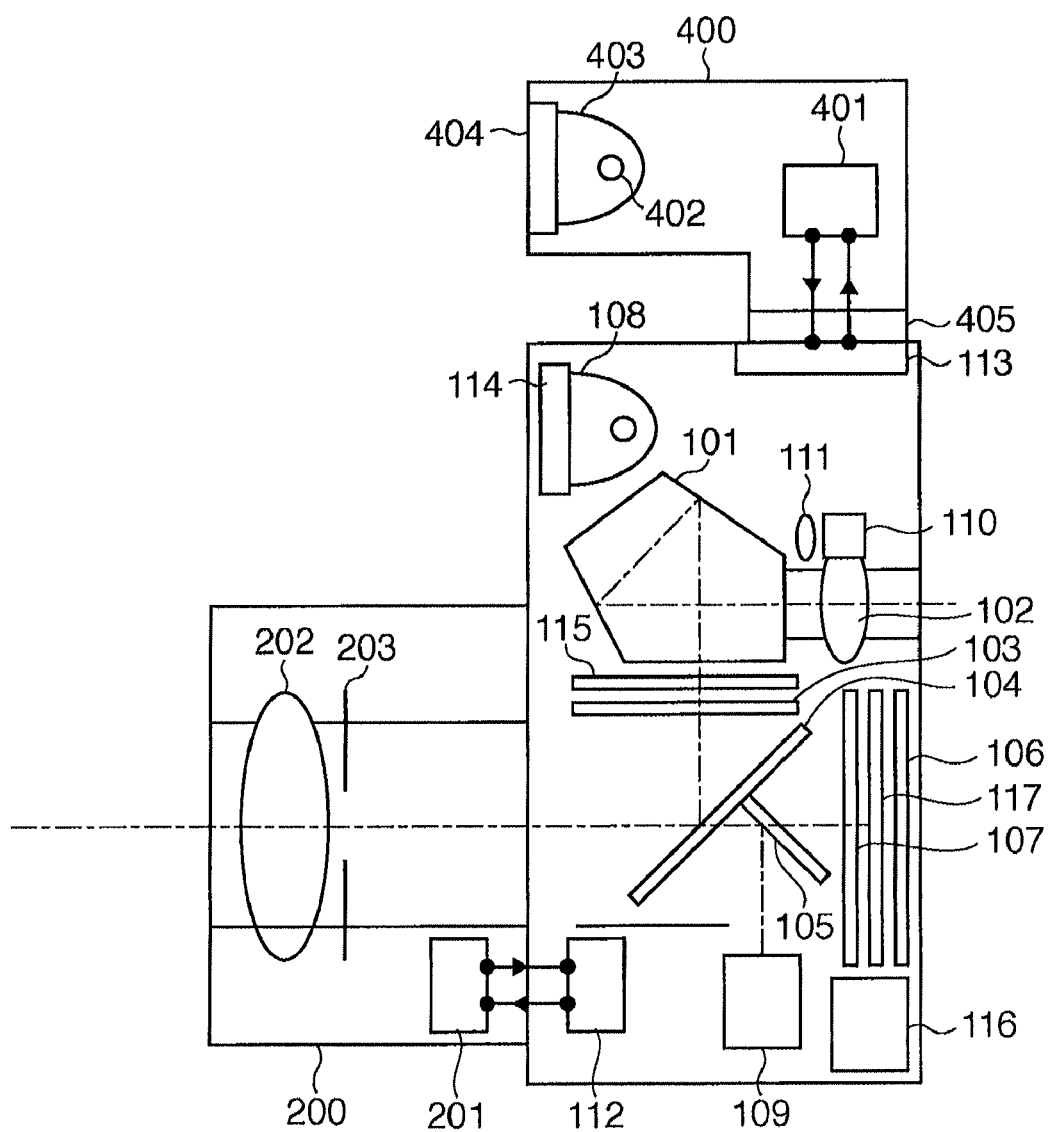
FIG. 1 is a block diagram showing the mechanical arrangement of an image sensing apparatus according to the first embodiment of the present invention.

The mechanical arrangement of an image sensing apparatus according to the first embodiment will be described first with reference to FIG. 1. Referring to FIG. 1, reference numeral 100 denotes an image sensing apparatus such as a digital camera, which can shoot still pictures and movies. Reference numeral 101 denotes an erect orthoscopic optical system which forms a viewfinder optical system; 102, an eyepiece; and 103, a viewfinder screen. Reference numeral 104 denotes a main half mirror (to be referred to as a main mirror hereinafter), which deflects an image sensing light beam to the viewfinder optical system 101; and 105, a sub-mirror which deflects an image sensing light beam to a focus detection unit 109 (to be described later). The main mirror 104 and sub-mirror 105 form an optical path splitting optical system. Reference numeral 106 denotes an image sensing element such as a CCD sensor or CMOS sensor, which photoelectrically converts an image sensing light beam; and 107, a focal plane shutter (to be referred to as a shutter device hereinafter), which switches the image sensing element 106 between an exposure state and a non-exposure state.

Reference numeral 108 denotes an internal strobe device built in the image sensing device 100. The focus detection unit 109 has at least a pair of pixel sequences (line sensors), and the pair of line sensors photoelectrically convert a pair of images formed by beams coming from a shooting optical system (to be described later), and output image signals.

Reference numeral 110 denotes a photometry sensor that measures object luminance; and 111, a photometry lens which images a light beam coming from an object. Reference numeral 112 denotes a camera microprocessor that controls various operations of the image sensing apparatus 100. Reference numeral 113 denotes an accessory shoe used to mount, for example, an external strobe device 400 to be externally attached. Reference numeral 114 denotes a Fresnel lens arranged in the internal strobe device 108. Reference numeral 115 denotes a viewfinder display unit which displays various kinds of information for the user who looks in the viewfinder screen 103. Reference numeral 116 denotes an external display unit, which is arranged on the outer surface of the image sensing apparatus 100, and serves as an electronic viewfinder (EVF). Reference numeral 117 denotes a low-pass filter arranged in front of the image sensing element 106.

Reference numeral 200 denotes a lens device detachable from the image sensing apparatus 100. Reference numeral 201 denotes a lens microprocessor which controls various operations of the lens device 200, and communicates with the camera microprocessor 112 via a communication contact. Reference numeral 202 denotes a lens serving as an imaging optical system which forms a shooting optical system; and 203, a stop used to adjust a light amount. Note that FIG. 1 illustrates only one lens 202, but the shooting optical system is configured by a plurality of lenses in practice. In the external strobe device 400, reference numeral 401 denotes a strobe microprocessor which controls the light emission operation of the external strobe device 400. Reference numeral 402 denotes a discharge light-emitting tube such as a xenon tube; and 403, a reflecting umbrella which reflects a light beam emitted by the light-emitting tube 402 toward an object. Reference numeral 404 denotes a strobe panel which controls distribution of the light beam reflected by the reflecting umbrella 403. Reference numeral 405 denotes a mount member to be mounted on the accessory shoe 113 of the image sensing apparatus 100.

In this embodiment, the image sensing apparatus 100 (camera microprocessor 112) communicates with the lens device 200 (lens microprocessor 201) and the external strobe device 400 (strobe microprocessor 401). Then, the image sensing apparatus 100 executes control using pieces of information possessed by the lens device 200 and external strobe device 400.

Figure 2:
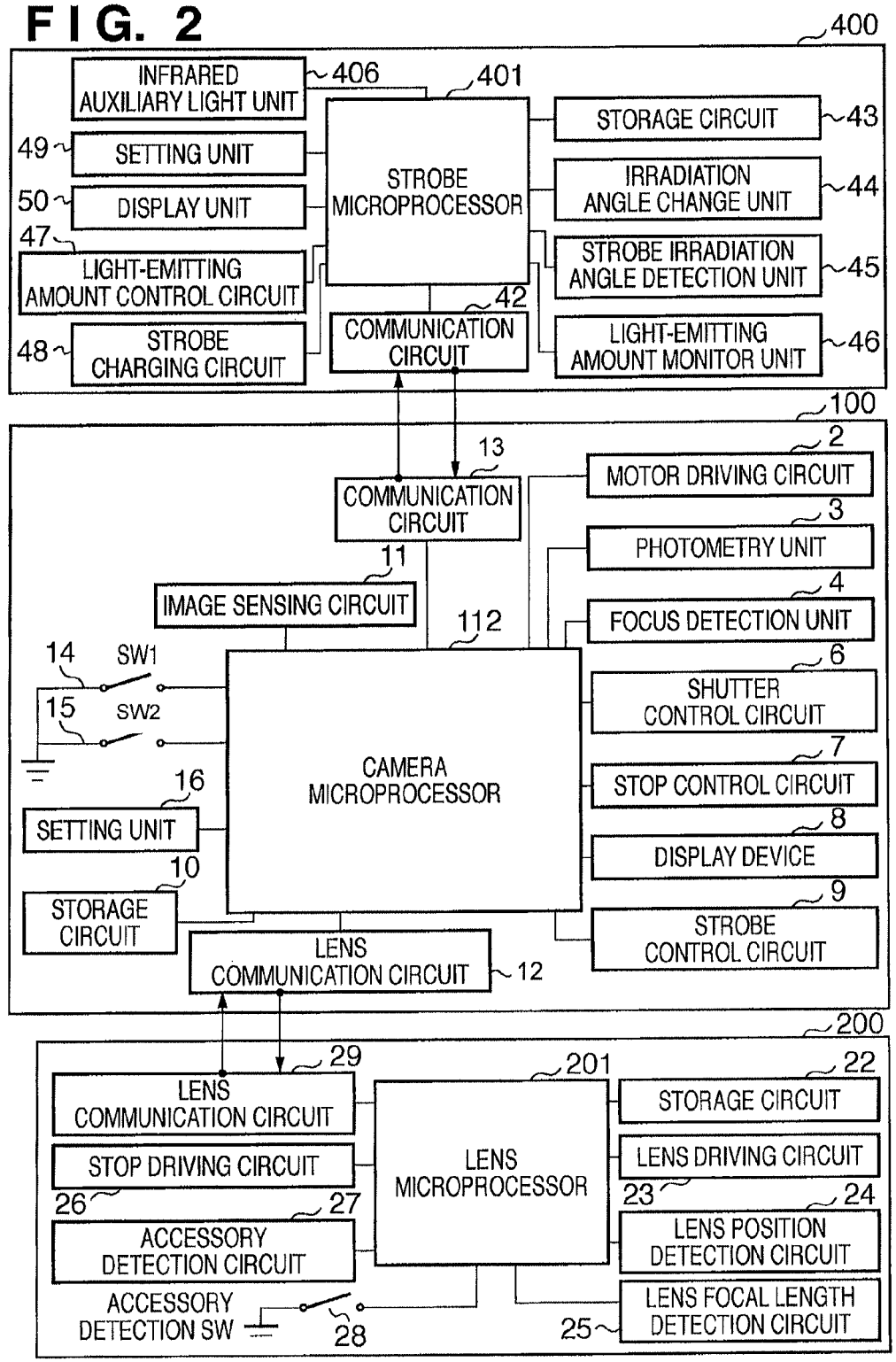
FIG. 2 is a block diagram showing the electrical arrangement of the image sensing apparatus according to the first embodiment.

The electrical arrangements of the image sensing apparatus 100, lens device 200, and external strobe device 400 shown in FIG. 1 will be described below with reference to FIG. 2. In FIG. 2, the arrangement of the image sensing apparatus 100 will be described first. Reference numeral 112 denotes the camera microprocessor which controls the image sensing apparatus 100; and 2, a motor driving circuit required to drive various motors in the image sensing apparatus 100. Reference numeral 3 denotes a photometry unit which measures object luminance, and is included in the photometry sensor 110 in FIG. 1. Reference numeral 4 denotes a focus detection unit which detects a focus state of the lens device 200, and is included in the focus detection unit 109 in FIG. 1. Reference numeral 6 denotes a shutter control circuit which controls an exposure amount of the image sensing apparatus 100, and is included in the shutter device 107 in FIG. 1. Reference numeral 7 denotes a stop control circuit which controls a light beam to be fetched into the image sensing apparatus 100, and is included in the stop device 203 in FIG. 1. Reference numeral 8 denotes a display device that displays the state of the image sensing apparatus 100 and a sensed image, and includes the viewfinder display unit 115 and external display unit 116 in FIG. 1. Reference numeral 9 denotes a strobe control circuit which controls the internal strobe device 108. Reference numeral 10 denotes a storage circuit used to store the setting state of the image sensing apparatus 100. Reference numeral 11 denotes an image sensing circuit which executes signal processing for a signal output from the image sensing element 106. Reference numeral 12 denotes a lens communication circuit used to communicate with the lens device 200 attached to the image sensing apparatus 100. Reference numeral 13 denotes a communication circuit used to communicate with an accessory other than the lens device 200. Reference numeral 14 (SW1) denotes a switch used to instruct to start an image sensing preparation operation; and 15 (SW2), a switch used to instruct to start an image sensing operation. Reference numeral 16 denotes a setting unit which sets a shooting mode, shooting conditions, and the like of the image sensing apparatus 100. The setting unit 16 can set a single shooting mode for executing one shooting operation in response to a single ON operation of the switch 15, and also a continuous shooting mode for continuously executing shooting operations while the switch 15 is kept ON. The internal strobe device 108 not only illuminates an object at the time of shooting when the external strobe device 400 is not attached, but also has a function as auxiliary light that illuminates an object in a focus detection operation.

The arrangement of the lens device 200 will be described below. Reference numeral 201 denotes the lens microprocessor which controls the lens device 200; 22, a storage circuit which retains the setting values of the lens device 200; and 23, a lens driving circuit which drives the lens device 200. Reference numeral 24 denotes a lens position detection circuit which detects the position of the lens device 200; and 25, a focal length detection circuit which detects a set focal length of the lens device 200. Reference numeral 26 denotes a stop driving circuit which drives the stop, and is included in the stop device 203 in FIG. 1. Reference numeral 27 denotes an accessory detection circuit which detects an accessory attached to the lens device 200. Reference numeral 28 denotes an accessory detection switch which detects an accessory attached to the lens device 200; and 29, a lens communication circuit used to communicate with accessories attached to the image sensing apparatus 100 and lens device 200. The lens communication circuit 29 receives a control instruction from the image sensing apparatus 100, and transmits shape information stored in the lens device 200, accessory information attached to the lens device 200, lens setting values, and the like.

The arrangement of the external strobe device 400 will be described below. Reference numeral 401 denotes the strobe microprocessor which controls the external strobe device 400 as an accessory; 42, a communication circuit used to communicate with the image sensing apparatus 100; and 43, a storage circuit which retains setting values of the external strobe device 400. Reference numeral 44 denotes an irradiation angle change unit which changes a strobe irradiation range in correspondence with the states of the image sensing apparatus 100 to which the external strobe device 400 is attached, and the lens device 200; and 45, a strobe irradiation angle detection unit which detects setting values of the strobe irradiation range. Reference numeral 46 denotes a light-emitting amount monitor unit which directly monitors a light-emitting amount of the external strobe device 400; 47, a light-emitting amount control circuit which controls the strobe light-emitting amount; and 48, a strobe charging circuit for charging the strobe. Reference numeral 49 denotes a setting unit used to set the state of the external strobe device 400; 50, a display unit used to display the setting state of the external strobe device 400; and 406, an infrared auxiliary light unit incorporated in the external strobe device 400. The communication circuit 42 is configured to exchange the setting information and control information of the external strobe device 400. The infrared auxiliary light unit 406 projects infrared light based on an instruction from the image sensing apparatus 100.

Figure 3A:
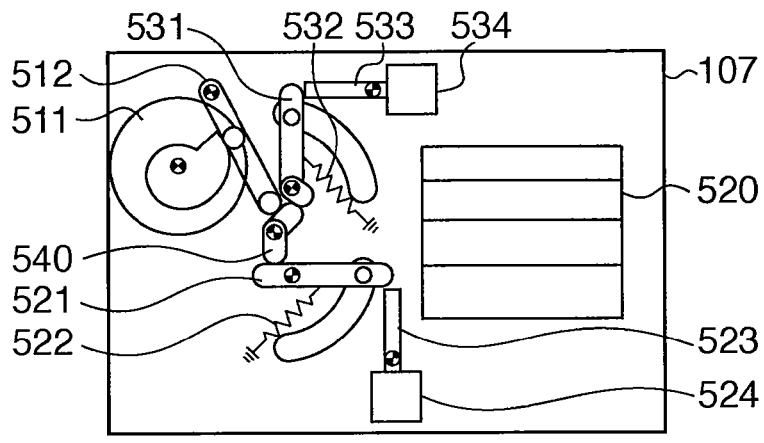
FIGS. 3A to 3D are views showing state changes from a shutter charge operation until a shutter trailing blade travels in the first embodiment.
Figure 3B:
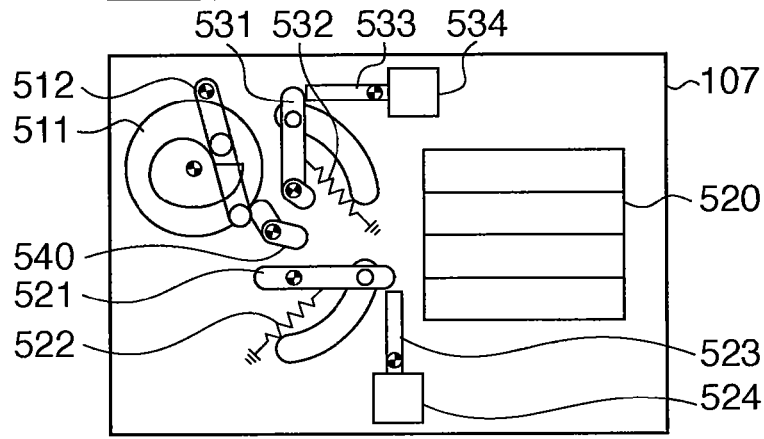
Figure 3C:
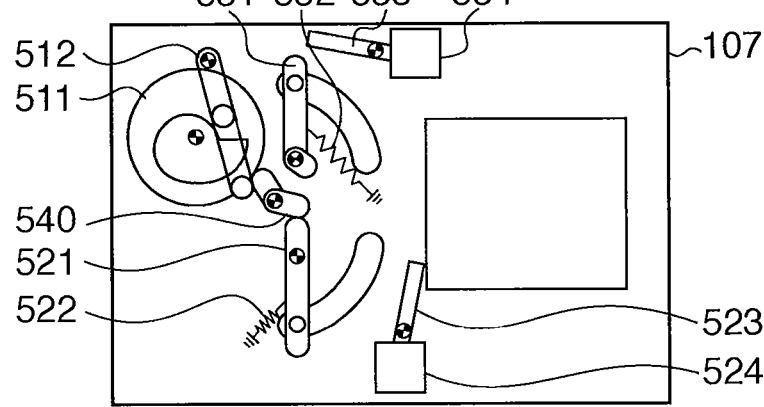
Figure 3D:
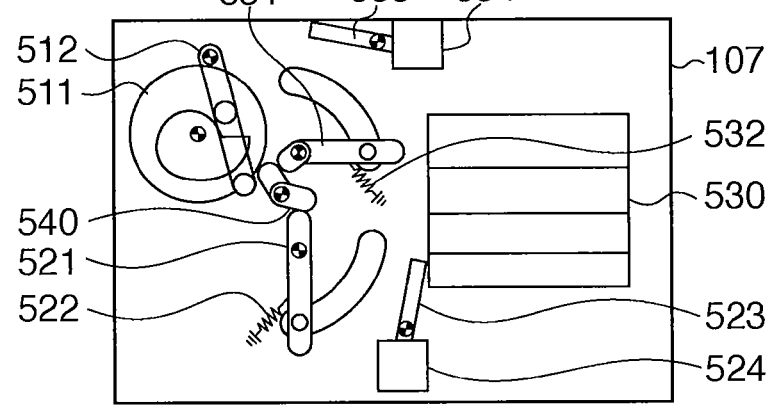

The operation of the mechanical shutter device 107 of the first embodiment will be described below with reference to FIGS. 3A to 3D. In this mechanical shutter device 107, a latch mechanism that retains a shutter blade is mechanically driven by a motor to release a latched state. FIG. 3A shows an over-charged state after a charge operation of the shutter device is completed. FIG. 3B shows a travel prepared state in which the over-charged state of the shutter device is released, and the latch mechanism retains shutter leading and trailing blades. FIG. 3C shows an exposure state in which the shutter leading blade traveled, and FIG. 3D shows a travel completed state in which the shutter trailing blade traveled.

Referring to FIGS. 3A to 3D, reference numeral 511 denotes a cam gear which is used to perform a shutter charge operation, and is driven by a shutter driving motor (not shown). Reference numeral 512 denotes a charge lever, which is formed with a cam follower that traces a cam formed on the cam gear 511. Reference numeral 520 denotes a shutter leading blade group which closes a shutter opening before exposure, and forms a shutter blade. Reference numeral 521 denotes a shutter leading blade driving lever as a shutter driving member, which engages with the shutter leading blade group 520 to drive it. Reference numeral 522 denotes a shutter leading blade driving spring. When the shutter leading blade driving spring 522 urges the shutter leading blade driving lever 521, the shutter leading blade group 520 is driven. Reference numeral 523 denotes a shutter leading blade latch lever. The shutter leading blade latch lever 523 retains the shutter leading blade driving lever 521 at a travel prepared position. Reference numeral 524 denotes a shutter leading blade latch driving member which drives the shutter leading blade latch lever 523 to travel the shutter leading blade group 520.

Reference numeral 530 denotes a shutter trailing blade group which closes the shutter opening after exposure and forms the shutter member. Reference numeral 531 denotes a shutter trailing blade driving lever as a shutter driving member which engages with the shutter trailing blade group 530 to drive it. Reference numeral 532 denotes a shutter trailing blade driving spring. When the shutter trailing blade driving spring 532 urgee the shutter trailing blade driving lever 531, the shutter trailing blade group 530 is driven. Reference numeral 533 denotes a shutter trailing blade latch lever. The shutter trailing blade latch lever 533 retains the shutter trailing blade driving lever 531 at a travel prepared position. Reference numeral 534 denotes a shutter trailing blade latch driving member which drives the shutter trailing blade latch lever 533 to travel the shutter trailing blade group 530. Reference numeral 540 denotes a cam lever which is used to charge the shutter leading blade driving lever 521 and shutter trailing blade driving lever 531, and is driven by the charge lever 512. In the aforementioned arrangement, the cam gear 511, charge lever 512, and cam lever 540 form a shutter charge mechanism. The shutter leading blade latch lever 523, shutter leading blade latch driving member 524, shutter trailing blade latch lever 533, and shutter trailing blade latch driving member 534 form a latch mechanism.

In FIG. 3A, when the charge lever 512 is lifted to a cam top position of the cam gear 511, the cam lever 540 sets the shutter leading blade driving lever 521 and shutter trailing blade driving lever 531 in an over-charged state. At this time, the shutter leading blade latch lever 523 and shutter trailing blade latch lever 533 are returned to positions where they can retain the shutter leading blade driving lever 521 and shutter trailing blade driving lever 531. However, in the over-charged state, the shutter leading blade latch lever 523 and shutter leading blade driving lever 521, and the shutter trailing blade latch lever 533 and shutter trailing blade driving lever 531 have a positional relationship in which they do not contact each other. That is, the shutter leading blade driving lever 521 and shutter trailing blade driving lever 531 are retained by the cam lever 540 in place of the shutter leading blade latch lever 523 and shutter trailing blade latch lever 533.

FIG. 3B shows a state in which the charge lever 512 deviates from the cam top position of the cam gear 511, and the cam lever 540 turns counterclockwise. In this state, the shutter leading blade driving lever 521 and shutter trailing blade driving lever 531 are released from the over-charged state by the cam lever 540, and are set in a travel prepared state. In this travel prepared state, the over-charged state of the shutter leading blade driving lever 521 and shutter trailing blade driving lever 531 by the cam lever 540 is released. Then, the shutter leading blade latch lever 523 and shutter trailing blade latch lever 533 retain the shutter leading blade driving lever 521 and shutter trailing blade driving lever 531.

FIG. 3C shows a state during exposure in which the shutter leading blade group 520 traveled. In this exposure state, the shutter leading blade latch lever 523 is driven by the shutter leading blade latch driving member 524, and the shutter leading blade latch lever 523 and shutter leading blade driving lever 521 are disengaged. After the shutter leading blade latch lever 523 and shutter leading blade driving lever 521 are disengaged, the shutter leading blade driving spring 522 drives the shutter leading blade driving lever 521, and the shutter leading blade group 520 travels.

FIG. 3D shows a state in which the shutter trailing blade group 530 travels to complete exposure. In this exposure completed state, the shutter trailing blade latch driving member 534 drives the shutter trailing blade latch lever 533 to disengage the shutter trailing blade latch lever 533 and shutter trailing blade driving lever 531. After the shutter trailing blade latch lever 533 and shutter trailing blade driving lever 531 are disengaged, the shutter trailing blade driving spring 532 drives the shutter trailing blade driving lever 531, and the shutter trailing blade group 530 travels.

In this embodiment, when the user sets a mode such as the single shooting mode other than the continuous shooting mode at the setting unit 16, the shutter device 107 is stopped to be set in the over-charged state in FIG. 3A. Then, in response to a shutter release operation, the over-charged state is released, as shown in FIG. 3B, and the shutter leading blade latch lever 523 and shutter trailing blade latch lever 533 retain the shutter leading blade driving lever 521 and shutter trailing blade driving lever 531. For this reason, the shutter blade can be prevented from inadvertently traveling.

When the user sets the continuous shooting mode at the setting unit 16, the shutter device is not stopped in the over-charged state in FIG. 3A when it is to be re-charged after the shutter leading blade group 520 and shutter trailing blade group 530 travel in FIGS. 3C and 3D, but it is driven at once to the travel prepared state in which the over-charged state is released, as shown in FIG. 3B. Thus, the operations under a variety of power supply conditions and environmental conditions are stabilized.

FIGS. 4A and 4B show the operation timings of shutter and mirror charge operations of this embodiment, and compare shooting times per frame in the operations when the single shooting mode is set (FIG. 4A) and those when the continuous shooting mode is set (FIG. 4B). In the operations when the single shooting mode is set, as shown in FIG. 4A, the camera microprocessor 112 waits for a shutter release operation in a state in which mirror-down, mirror charge, and shutter charge operations are completed, and the shutter device is stopped in the over-charged state in FIG. 3A. After detection of the shutter release operation, a mirror-up operation (to release a mirror charged state) is performed, and the cam gear 511 is driven from the over-charged state in FIG. 3A to the travel prepared state in FIG. 3B in which the over-charged state is released. For this reason, when the operations shown in FIG. 4A are performed in the continuous shooting mode, the cam gear 511 is temporarily stopped in the over-charged state, and is then driven from the over-charged state to the travel prepared state, thus requiring a longer time until a shooting operation of the next frame starts.

By contrast, in the operations in FIG. 4B in the continuous shooting mode, after completion of the previous frame shooting operation, mirror-down, mirror charge, and shutter charge operations are performed, and at the time of completion of the shutter charge operation, the presence/absence of the next shutter release operation is detected. Then, when the shutter release operation is to be continued, the cam gear 511 is not stopped in the over-charged state, but it is driven to the travel prepared state in FIG. 3B. For this reason, a time required to release the over-charged state and to shift to the travel prepared state can be shortened. Hence, a shutter release operation is allowed at the time of completion of the mirror-up operation, thus shortening a time required until the next frame shooting operation starts.

Figure 5A:
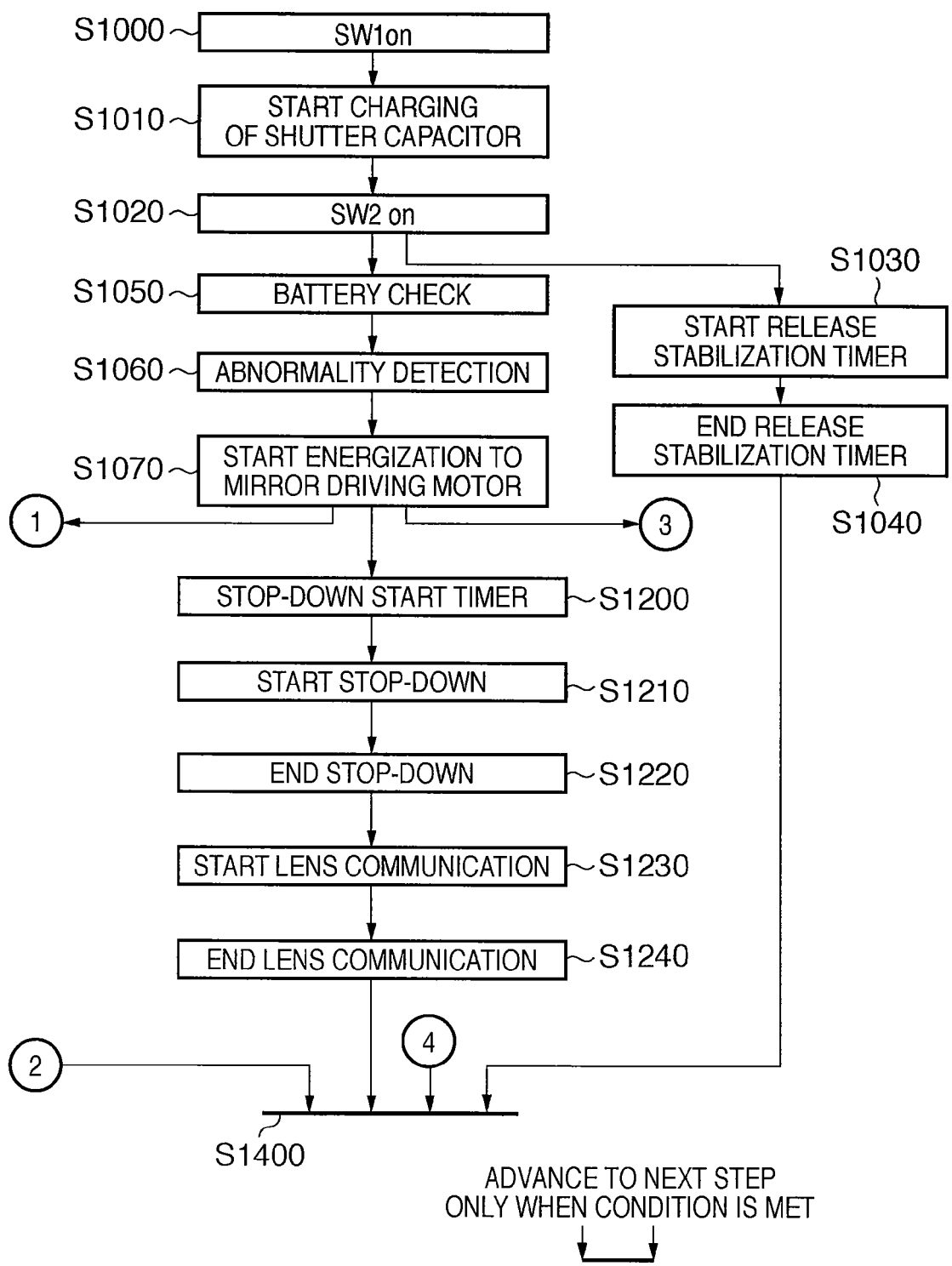
FIGS. 5A to 5D are flowcharts showing operations from a shutter release operation until an exposure operation of the image sensing apparatus according to the first embodiment.

A shooting operation according to this embodiment will be described below with reference to FIGS. 5A-5D. Note that the camera microprocessor 112 executes the following processes unless otherwise specified. In FIG. 5A, this processing starts when the switch 14 (SW1) is turned on, and a first release stage signal is detected (S1000). In step S1010, the shutter control circuit 6 begins to charge a latch release capacitor. In the shutter device 107 of this embodiment, the capacitor of the shutter control circuit 6 is charged in advance. Then, by discharging the capacitor when the shutter travels, the shutter leading blade latch driving member 524 and shutter trailing blade latch driving member 534 are driven to travel the shutter leading blade group 520 and shutter trailing blade group 530.

In step S1020, the process advances to step S1030 if the camera microprocessor 112 detects a second release stage signal when the switch 15 (SW2) is turned on. However, while the camera microprocessor 112 does not detect any second release stage signal, the process advances to step S1050. This process configures second determination function. In step S1030, the camera microprocessor 112 starts a timer used to stabilize a release time lag. If the camera microprocessor 112 detects in step S1040 that the timer used to stabilize the release time lag has reached a time-out, the process advances to step S1400 to wait until other conditions are met.

The camera microprocessor 112 executes a battery check process in step S1050 to confirm if a power supply voltage (not shown) of the image sensing apparatus 100 is high enough, and confirms in step S1060 if any abnormality has occurred in the respective charge mechanisms of the image sensing apparatus 100. Then, the process advances to step S1070. In step S1070, the motor driving circuit 2 starts energization to a mirror driving motor, and the process advances to steps S1100, S1200, and S1300. In this case, the mirror driving motor is energized to perform a mirror-up operation required to retract the mirrors 104 and 105 of the image sensing apparatus 100 to positions outside the shooting optical path.

In step S1100, the camera microprocessor 112 starts a timer used to delay energization to the shutter driving motor. If the camera microprocessor 112 detects a time-out of the timer, the process advances to step S1110. In step S1110, the shutter control circuit 6 begins to energize the shutter driving motor, and the process advances to step S1120. The energization to the shutter driving motor in step S1110 is a process for controlling the shutter charge mechanism to release the retained shutter leading blade group 520 and shutter trailing blade group 530 in the over-charged state to shift to the travel prepared state.

The camera microprocessor 112 determines in step S1120 if the shutter charge mechanism has been driven to a shutter travel prepared position, that is, to a motor stop state. If the camera microprocessor 112 determines in step S1120 that the shutter charge mechanism has not been driven to the shutter travel prepared position yet, the process advances to step S1130. The camera microprocessor 112 determines in step S1130 whether or not an energization time of the shutter driving motor is equal to or larger than a predetermined value. If the camera microprocessor 112 determines in step S1130 that the energization time of the shutter driving motor is not equal to or larger than the predetermined value, the process returns to step S1120. On the other hand, if the camera microprocessor 112 determines in step S1130 that the energization time of the shutter driving motor is equal to or larger, than the predetermined value, the process advances to step S1140. In this case, since an arbitrary trouble may have occurred in the shutter charge mechanism, the camera microprocessor 112 stops driving of the shutter driving motor and displays an error message in step S1140.

On the other hand, if the camera microprocessor 112 determines in step S1120 that the shutter charge mechanism has been driven to the shutter travel prepared position, that is, to a state in which the shutter driving motor is to be stopped, the process advances to step S1150. In step S1150, the shutter control circuit 6 enables braking of the shutter driving motor so as to stop the shutter driving motor. The process then advances to step S1160.

The camera microprocessor 112 determines in step S1160 if the shutter charge mechanism is stopped at the shutter travel prepared position. If the camera microprocessor 112 determines in step S1160 that the shutter charge mechanism is not stopped at the shutter travel prepared position, the process advances to step S1170. Since the shutter charge mechanism is not located at the shutter travel prepared position and it is impossible to travel the shutter, the camera microprocessor 112 displays an error message in step S1170.

On the other hand, if the camera microprocessor 112 determines in step S1160 that the shutter charge mechanism is located at the shutter travel prepared position, the process advances to step S1180. In step S1180, since the travel preparation of the shutter charge mechanism is completed, the camera microprocessor 112 starts a shutter travel waiting timer used to stably travel the shutter. The process then advances to step S1400 to wait until other conditions are met.

In step S1200, the camera microprocessor 112 starts a stop-down start timer used to delay a stop driving start timing so as to deviate an activation timing from those of various actuation mechanisms. The process then advances to step S1210. In step S1210, the stop driving circuit 26 begins to drive the stop according to an exposure control value, and the process advances to step S1220. In step S1220, the stop driving circuit 26 stops the stop in a state in which the stop is driven to a predetermined value, and the process advances to step S1230. In step S1230, the camera microprocessor 112 starts a communication with the lens device 200 before a shooting operation, and the process advances to step S1240. In step S1240, the camera microprocessor 112 confirms completion of the communication with the lens device 200. The process then advances to step S1400 to wait until other conditions are met.

Furthermore, the camera microprocessor 112 determines in step S1300 whether or not the mirror driving motor, which had begun to be driven in step S1070, has reached a mirror-up state, that is, a brake state. If the camera microprocessor 112 determines in step S1300 that the mirror driving motor has not reached the brake position yet, the process advances to step S1310. The camera microprocessor 112 determines in step S1310 whether or not the energization time of the mirror driving motor is equal to or larger than a predetermined value. If the camera microprocessor 112 determines in step S1310 that the energization time of the mirror driving motor is not equal to or larger than the predetermined value, the process returns to step S1300. If the camera microprocessor 112 determines in step S1310 that the energization time of the mirror driving motor is equal to or larger than the predetermined value, the process advances to step S1320. In this case, since an arbitrary trouble may have occurred in the mirror charge mechanism, the camera microprocessor 112 stops driving of the mirror driving motor, and displays an error message in step S1320.

On the other hand, if the camera microprocessor 112 determines in step S1300 that the mirror driving motor has been driven to the mirror-up position, the process advances to step S1330. In step S1330, the camera microprocessor 112 enables braking of the mirror driving motor so as to stop the mirror driving motor, and the process advances to step S1340. In step S1340, the camera microprocessor 112 starts a mirror-up guarantee timer used to guarantee the mirror-up state, and the process advances to step S1350. The camera microprocessor 112 determines in step S1350 whether or not the mirror-up state is set. If the camera microprocessor 112 determines in step S1350 that the mirror-up state is not set, the process advances to step S1360. In this case, since an arbitrary trouble may have occurred in the mirrors, the camera microprocessor 112 displays an error message in step S1360. If the camera microprocessor 112 determines in step S1350 that the mirror-up state is set, the process advances to step S1400 to wait until other conditions are met.

In step S1400, the camera microprocessor 112 waits until the conditions in steps S1180, S1240, and S1350 are met. When all the conditions are met, the process advances to step S1410. In step S1410, the camera microprocessor 112 ends charging of the shutter driving capacitor, and the process advances to steep S1420. In step S1420, the camera microprocessor 112 energizes the shutter leading blade latch driving member 524 to start traveling of the shutter leading blade group 520. The process then advances to step S1430. In step S1430, the camera microprocessor 112 measures a time until start of traveling of the shutter trailing blade group based on an exposure control value. The process then advances to step S1440. In step S1440, the shutter control circuit 6 energizes the shutter trailing blade latch driving member 534 to start traveling of the shutter trailing blade group 530, and the process advances to step S1445. The camera microprocessor 112 determines in step S1445 whether the operation mode of the image sensing apparatus 100 is set in the single or continuous shooting mode. This process configures first determination function. If the camera microprocessor 112 determines in step S1445 that the single shooting mode is set, the process advances to step S1447 in FIG. 6A (to be described later). On the other hand, if the camera microprocessor 112 determines in step S1445 that the continuous shooting mode is set, the process advances to step S2000 in FIG. 7A (to be described later).

The charge operation when the single shooting mode is set will be described below with reference to FIGS. 6A-6C. Referring to FIG. 6A, since the camera microprocessor 112 determines in step S1445 in FIG. 5D that the single shooting mode is set, it starts the charge operation in the single shooting mode in step S1447, and the process advances to step S1450. In step S1450, the camera microprocessor 112 executes a battery check process to determine if electric power enough to perform the charge operation after the shutter device 107 travels can be assured. The process then advances to steps S1500 and S1700. The processes in steps S1500 and S1700 are parallelly executed.

In step S1500, the camera microprocessor 112 starts energization to the mirror driving motor to start mirror-down and mirror charge operations. The process then advances to steps S1510 and S1600. In step S1510, the camera microprocessor 112 starts a mirror-down timer used to guarantee the mirror-down state, and the process advances to step S1520. After the mirror down timer has reached a time-out in step S1520, the process advances to step S1750 to wait until other conditions are met.

The camera microprocessor 112 determines in step S1600 whether or not the mirror charge mechanism has reached a mirror charge completed position, that is, a brake position. If the camera microprocessor 112 determines in step S1600 that the mirror driving motor has not reached the brake position yet, the process advances to step S1610. The camera microprocessor 112 determines in step S1610 whether or not the energization time of the mirror driving motor is equal to or larger than a predetermined value. If the camera microprocessor 112 determines in step S1610 that the energization time of the mirror driving motor is not equal to or larger than the predetermined value, the process returns to step S1600. If the camera microprocessor 112 determines in step S1610 that the energization time of the mirror driving motor is equal to or larger than the predetermined value, the process advances to step S1620. In this case, since an arbitrary trouble may have occurred in the mirror charge mechanism, the camera microprocessor 112 stops driving of the mirror driving motor and displays an error message in step S1620.

On the other hand, if the camera microprocessor 112 determines in step S1600 that the mirror driving motor has reached the brake position, the process advances to step S1630. In step S1630, the camera microprocessor 112 enables braking of the mirror driving motor so as to stop the mirror driving motor. The process then advances to step S1750 to wait until other conditions are met.

In step S1700, the camera microprocessor 112 starts a stop opening start timer used to delay a stop opening timing. The process then advances to steps S1710 and S1800. In step S1710, the stop driving circuit 26 starts a stop opening operation, and the process advances to step S1720. After the stop is set in an open state in step S1720, the process advances to step S1750 to wait until other conditions are met. In step S1750, the camera microprocessor 112 waits until respective conditions in steps S1630, S1520, and S1720 are met. When all the conditions are met, the process advances to step S1760.

In step S1760, the focus detection unit 4 acquires the current focus state, and starts AF (focus adjustment operation). The photometry unit 3 acquires object luminance information, and starts AE (calculation of an exposure value). The process then advances to step S1770. After AF and AE are completed in step S1770, the process advances to step S1990 to wait until other conditions are met.

In step S1800, the camera microprocessor 112 starts a shutter charge stabilization timer used to wait until the shutter device 107 becomes stable after an exposure operation. The process then advances to steps S1810 in FIG. 6A and S1900 in FIG. 6C. In step S1810, the camera microprocessor 112 starts a capacitor charge waiting timer used to delay charging of the latch release capacitor, and the process advances to step S1820. In step S1820, the camera microprocessor 112 starts charging of the latch release capacitor. The process then advances to step S1990 to wait until other conditions are met.

The camera microprocessor 112 determines in step S1900 whether or not the shutter device 107 is in a travel completed state. If the camera microprocessor 112 determines in step S1900 that the shutter device 107 is not in the travel completed state, the process advances to step S1920. Since any abnormally may have occurred during the shutter travel operation, the camera microprocessor 112 displays an error message in step S1920.

On the other hand, if the camera microprocessor 112 determines in step S1900 that the shutter is in the travel completed state, the process advances to step S1910. In step S1910, the camera microprocessor 112 starts energization to the shutter driving motor, and the process advances to step S1930. The camera microprocessor 112 determines in step S1930 whether or not the shutter charge mechanism has been driven to an over-charged position, that is, to a state in which the shutter driving motor is to be stopped. If the camera microprocessor 112 determines in step S1930 that the shutter charge mechanism has not reached the over-charged position yet, the process advances to step S1960. The camera microprocessor 112 determines in step S1960 whether or not the energization time of the shutter driving motor is equal to or larger than a predetermined value. If the camera microprocessor 112 determines in step S1960 that the energization time of the shutter driving motor is not equal to or larger than the predetermined value, the process returns to step S1930. If the camera microprocessor 112 determines in step S1960 that the energization time of the shutter driving motor is equal to or larger than the predetermined value, the process advances to step S1970. In this case, since an arbitrary trouble may have occurred in the shutter charge mechanism, the camera microprocessor 112 stops driving of the shutter driving motor and displays an error message in step S1970.

If the camera microprocessor 112 determines in step S1930 that the shutter charge mechanism has been driven to the over-charged position, that is, the motor brake position, the process advances to step S1940. In step S1940, the camera microprocessor 112 enables braking of the shutter driving motor so as to stop the shutter driving motor, and the process advances to step S1950. The camera microprocessor 112 determines in step S1950 whether or not the shutter charge mechanism is stopped at the over-charged position. If the camera microprocessor 112 determines in step S1950 that the shutter charge mechanism is not located at the over-charged position, the process advances to step S1980. In step S1980, since the shutter charge mechanism is not located at the over-charged position, and the shutter charge operation is not completed, the camera microprocessor 112 displays an error message.

If the camera microprocessor 112 determines in step S1950 that the shutter charge mechanism is located at the over-charged position, the process advances to step S1990 to wait until other conditions are met. In step S1990, the camera microprocessor 112 waits until various conditions are met. When all the conditions are met, the camera microprocessor 112 sets a standby state.

Figure 7A:
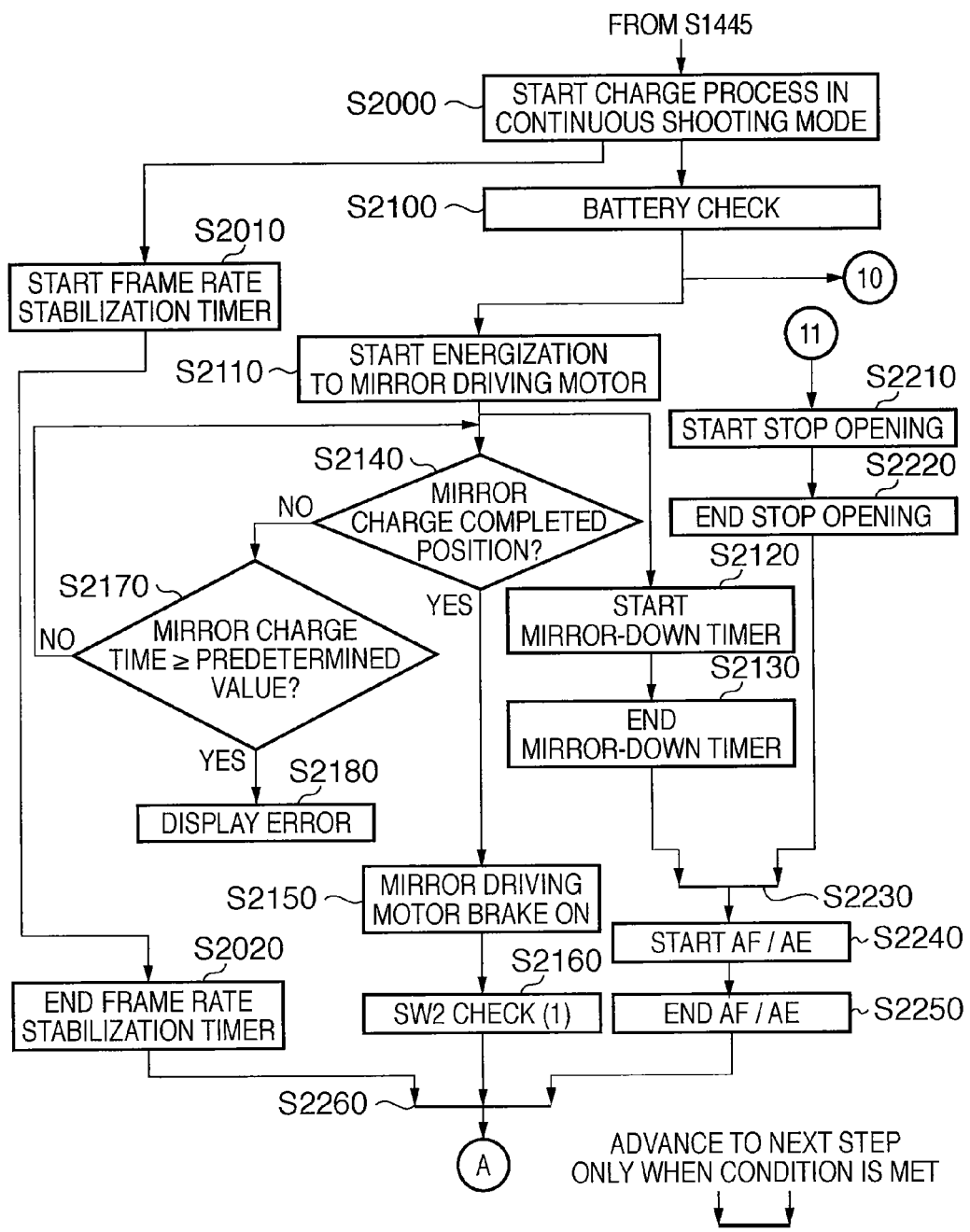
FIGS. 7A and 7B are flowcharts showing operations from the shutter release operation until the exposure operation of the image sensing apparatus according to the first embodiment.

The charge operation executed when the continuous shooting mode is set will be described below with reference to FIGS. 7A-7B and 8A-8B. Referring to FIG. 7A, since it is determined in step S1445 in FIG. 5D that the continuous shooting mode is set, the camera microprocessor 112 starts a charge operation process in the continuous shooting mode in step S2000, and the process advances to steps S2010 and S2100. In step S2010, the camera microprocessor 112 starts a frame rate stabilization timer used to stabilize a frame rate during continuous shooting, and the process advances to step S2020. After the frame rate stabilization timer has reached a time-out in step S2020, the process advances to step S2260 to wait until other conditions are met.

In step S2100, the camera microprocessor 112 executes a battery check process to determine if electric power enough to perform the charge operation after the shutter device 107 travels can be assured. Then, the process advances to steps S2110 and S2200. In step S2110, the camera microprocessor 112 starts energization to the mirror driving motor to start mirror-down and mirror charge operations. The process then advances to steps S2120 and S2140.

In step S2120, the camera microprocessor 112 starts a mirror-down timer used to guarantee the mirror-down state, and the process advances to step S2130. After the mirror-down timer has reached a time-out in step S2130, the process advances to step S2230 to wait until other conditions are met. The camera microprocessor 112 determines in step S2140 whether or not the mirror charge mechanism has reached a mirror charge completed position, that is, a brake position.

If the camera microprocessor 112 determines in step S2140 that the mirror driving motor has not reached the brake position yet, the process advances to step S2170. The camera microprocessor 112 determines in step S2170 whether or not the energization time of the mirror driving motor is equal to or larger than a predetermined value. If the camera microprocessor 112 determines in step S2170 that the energization time of the mirror driving motor is not equal to or larger than the predetermined value, the process returns to step S2140. If the camera microprocessor 112 determines in step S2170 that the energization time of the mirror driving motor is equal to or larger than the predetermined value, the process advances to step S2180. In this case, since an arbitrary trouble may have occurred in the mirror charge mechanism, the camera microprocessor 112 stops driving of the mirror driving motor and displays an error message in step S2180.

If the camera microprocessor 112 determines in step S2140 that the mirror driving motor has been driven to the brake position, the process advances to step S2150. In step S2150, the camera microprocessor 112 enables braking of the mirror driving motor so as to stop the mirror driving motor. The process then advances to step S2160. In step S2160, the camera microprocessor 112 executes a first SW2 check routine, and the process advances to step S2260 to wait until other conditions are met. This process configures second determination function.

In step S2200, the camera microprocessor 112 starts a stop opening start timer used to delay a stop opening timing, and the process advances to steps S2210, S2300, and S2400. In step S2210, the camera microprocessor 112 starts a stop opening operation, and the process advances to step S2220. After the stop driving circuit 26 sets the stop in an open state in step S2220, the process advances to step S2230 to wait until other conditions are met.

In step S2230, the camera microprocessor 112 waits until respective conditions in steps S2130 and S2220 are met. When all the conditions are met, the process advances to step S2240. In step S2240, the camera microprocessor 112 starts the AF/AE operations as in steps S1760 and S1770 in FIG. 6B. After the AF/AE operations are completed in step S2250, the process advances to step S2260 to wait until other conditions are met. In step S2260, the camera microprocessor 112 waits until respective conditions in steps S2020, S2160, and S2250 are met. When all the conditions are met, the process advances to step S2500.

In step S2300, the camera microprocessor 112 starts a shutter charge stabilization timer used to wait until the shutter device 107 becomes stable after an exposure operation, and the process advances to step S2310. The camera microprocessor 112 determines in step S2310 whether or not the shutter device 107 is set in a travel completed state. If the camera microprocessor 112 determines in step S2310 that the shutter is not set in the travel completed state, the process advances to step S2320. In this case, since any abnormality may have occurred during the shutter travel operation, the camera microprocessor 112 displays an error message in step S2320.

If the camera microprocessor 112 determines in step S2310 that the shutter device 107 is set in the travel completed state, the process advances to step S2325. In step S2325, the camera microprocessor 112 determines a shutter charge mode. If the camera microprocessor 112 determines a charge time stabilization mode in step S2325, the process advances to step S2326. In step S2326, the camera microprocessor 112 sets motor driving conditions based on, for example, power supply conditions of the image sensing apparatus and surrounding environmental conditions, and the process advances to step S2327. In step S2327, the camera microprocessor 112 starts energization to the shutter driving motor based on the motor driving conditions set in step S2326, and the process then advances to step S2340.

If the camera microprocessor 112 determines a normal mode in step S2325, the process advances to step S2330. In step S2330, the camera microprocessor 112 starts energization to the shutter driving motor, and the process advances to step S2340. In step S2340, the camera microprocessor 112 executes a shutter charge driving operation, and the process advances to step S2350. During the shutter charge operation in the normal mode, since the speed changes depending on, for example, the power supply conditions of the image sensing apparatus 100, and the shutter device is not temporarily stopped in the over-charged state in the continuous shooting mode, a shorter charge time can be set, and a shooting time per frame can be shortened.

The camera microprocessor 112 determines in step S2350 whether or not the shutter charge mechanism has been driven to an over-charged position, that is, a motor stop state. If the camera microprocessor 112 determines in step S2350 that the shutter charge mechanism has not been driven to the over-charged position yet, the process advances to step S2360. The camera microprocessor 112 determines in step S2360 whether or not the energization time of the shutter driving motor is equal to or larger than a predetermined value. If the camera microprocessor 112 determines in step S2360 that the energization time of the shutter driving motor is not equal to or larger than the predetermined value, the process returns to step S2350. If the camera microprocessor 112 determines in step S2360 that the energization time of the shutter driving motor is equal to or larger than the predetermined value, the process advances to step S2370. In this case, since an arbitrary trouble may have occurred in the shutter charge mechanism, the camera microprocessor 112 stops driving of the shutter driving motor, and displays an error message in step S2370.

If the camera microprocessor 112 determines in step S2350 that the shutter charge mechanism has been driven to the over-charged position, that is, to the motor brake position, the process advances to step S2380. In step S2380, the camera microprocessor 112 executes a second SW2 check routine, and the process advances to step S2450 to wait until other conditions are met. This process configures second determination function.

In step S2400, the camera microprocessor 112 starts a capacitor charge waiting timer used to delay charging to the latch release capacitor, and the process advances to step S2410. In step S2410, the camera microprocessor 112 starts charging to the latch release capacitor, and the process advances to step S2450 to wait until other conditions are met. In step S2450, the camera microprocessor 112 waits until respective conditions in steps S2380 and S2410 are met. When all the conditions are met, the process advances to step S2700.

Subsequently, in FIG. 8A, the camera microprocessor 112 detects a mirror charge position in step S2500, and the process advances to step S2510. In step S2510, the camera microprocessor 112 starts a prediction stabilization timer, and the process advances to steps S2515 and S2520. After the prediction stabilization timer has reached a time-out in step S2515, the process advances to step S2800 to wait until other conditions are met.

In step S2520, the camera microprocessor 112 starts energization to the mirror driving motor, and the process advances to steps S2530 and S2600. The camera microprocessor 112 determines in step S2530 whether or not the mirror driving motor, which had begun to be driven in step S2520, has reached a mirror-up state, that is, to a brake state. If the camera microprocessor 112 determines in step S2530 that the mirror driving motor has not reached the brake position yet, the process advances to step S2540. The camera microprocessor 112 determines in step S2540 whether or not the energization time of the mirror driving motor is equal to or larger than a predetermined value. If the camera microprocessor 112 determines in step S2540 that the energization time of the mirror driving motor is not equal to or larger than the predetermined value, the process returns to step S2530. If the camera microprocessor 112 determines in step S2540 that the energization time of the mirror driving motor is equal to or larger than the predetermined value, the process advances to step S2550. In this case, since an arbitrary trouble may have occurred in the mirror charge mechanism, the camera microprocessor 112 stops driving of the mirror driving motor, and displays an error message in step S2550.

If the camera microprocessor 112 determines in step S2530 that the mirror driving motor has been driven to the brake position, the process advances to step S2560. In step S2560, the camera microprocessor 112 enables braking of the mirror driving motor so as to stop the mirror driving motor, and the process advances to step S2570. In step S2570, the camera microprocessor 112 starts a mirror-up guarantee timer used to guarantee the mirror-up state, and the process advances to step S2580. The camera microprocessor 112 determines in step S2580 whether or not the mirror-up state is set. If the camera microprocessor 112 determines in step S2580 that the mirror-up state is not set, the process advances to step S2590. In this case, since an arbitrary trouble may have occurred in the mirrors, the camera microprocessor 112 displays an error message in step S2590. If the camera microprocessor 112 determines in step S2580 that the mirror-up state is set, the process advances to step S2800 to wait until other conditions are met.

In steps S2600 to S2640, the camera microprocessor 112 executes the stop driving operation in the same manner as in steps S1200 to S1240 in FIG. 5A. After completion of a communication with the lens, the process advances to step S2800 to wait until other conditions are met.

Figure 7B:
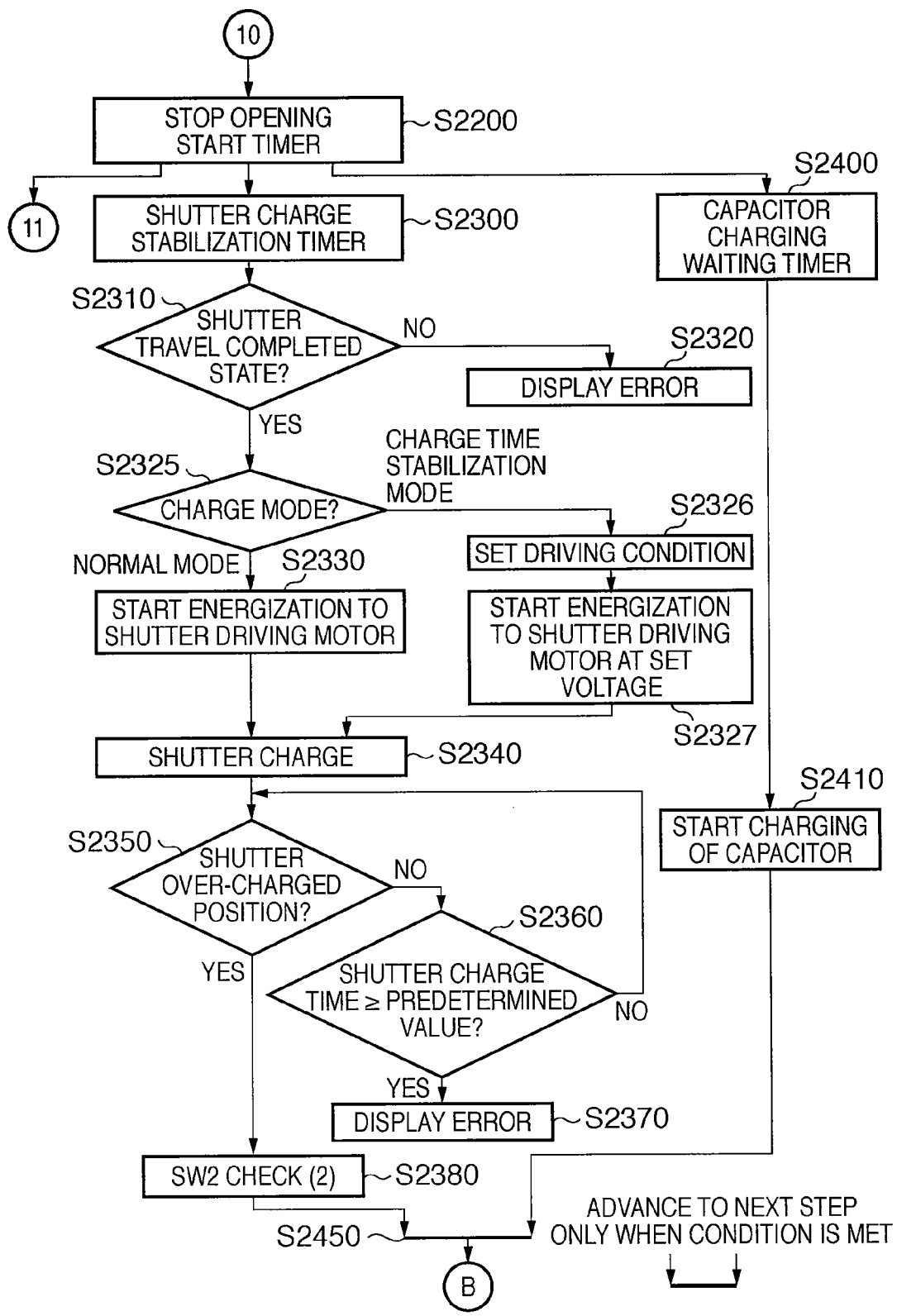
Figure 8A:
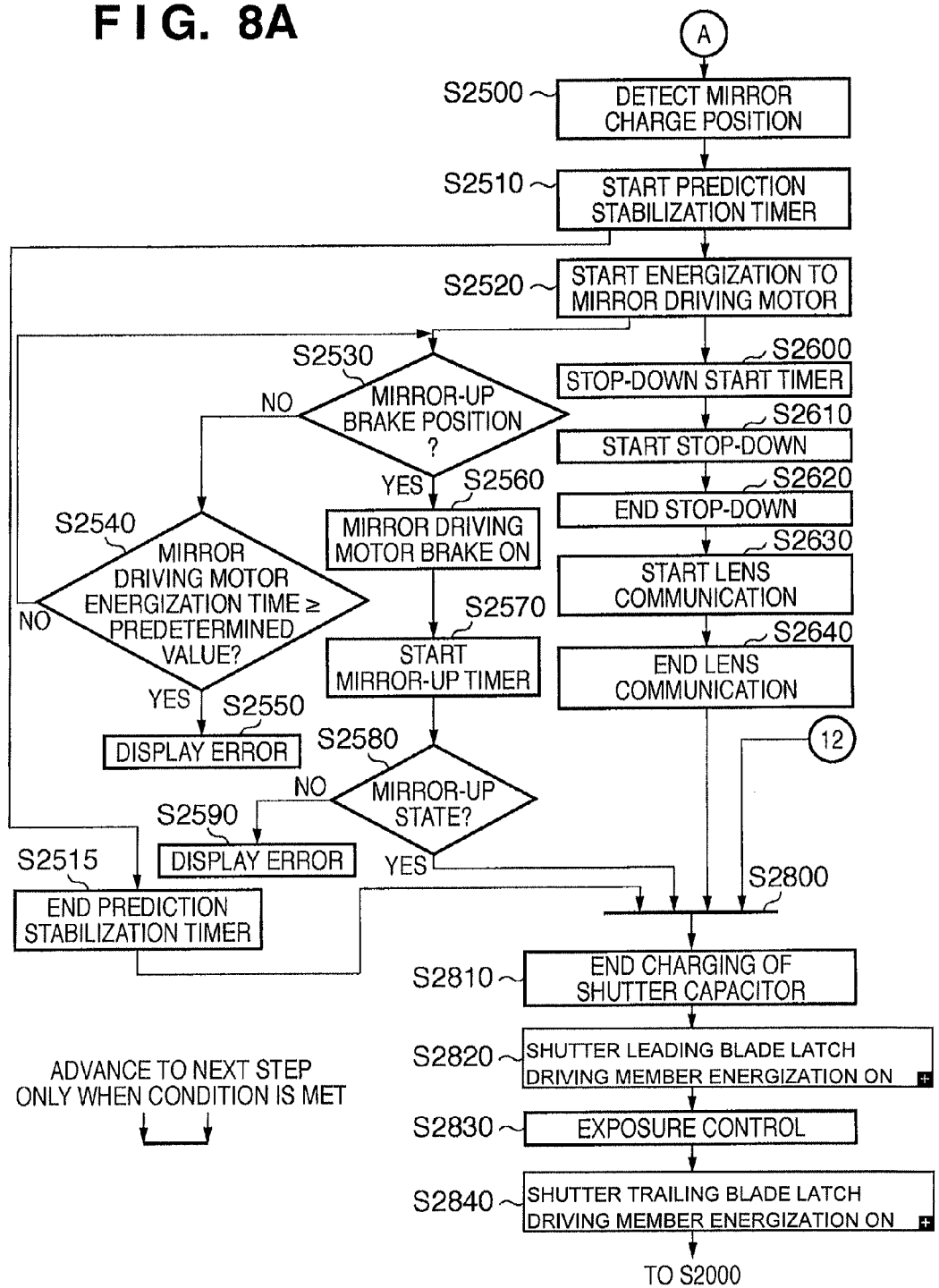
FIGS. 8A and 8B are flowcharts showing operations from the shutter release operation until the exposure operation of the image sensing apparatus according to the first embodiment.
Figure 8B:
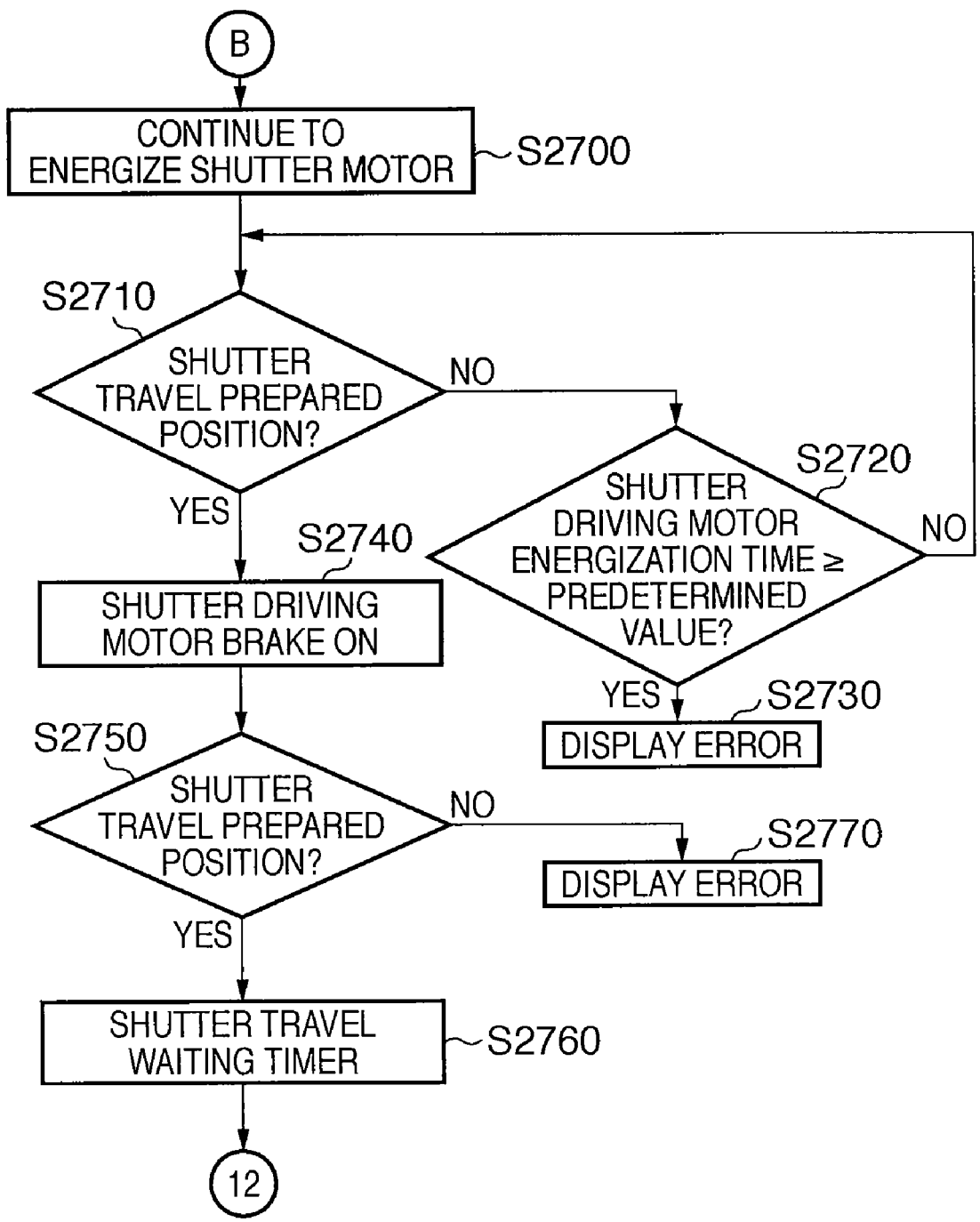

In FIG. 8B, step S2700 indicates that the shutter driving motor is kept driven from step S2450 in FIG. 7B, and the process advances to step S2710. The camera microprocessor 112 determines in step S2710 whether or not the shutter charge mechanism has been driven to the shutter travel prepared position, that is, to a motor stop position. If the camera microprocessor 112 determines that the shutter charge mechanism has not been driven to the shutter travel prepared position yet in step S2710, the process advances to step S2720. The camera microprocessor 112 determines in step S2720 whether or not the energization time of the shutter driving motor is equal to or larger than a predetermined value. If the camera microprocessor 112 determines in step S2720 that the energization time of the shutter driving motor is not equal to or larger than the predetermined value, the process returns to step S2710. If the camera microprocessor 112 determines in step S2720 that the energization time of the shutter driving motor is equal to or larger than the predetermined value, the process advances to step S2730. In this case, since an arbitrary trouble may have occurred in the shutter charge mechanism, the camera microprocessor 112 stops driving of the shutter driving motor and displays an error message in step S2730. If the camera microprocessor 112 determines in step S2710 that the shutter charge mechanism has been driven to the shutter travel prepared position, that is, to the motor brake position, the process advances to step S2740. In step S2740, the camera microprocessor 112 enables braking of the shutter driving motor so as to stop the shutter driving motor, and the process advances to step S2750.

The camera microprocessor 112 determines in step S2750 whether or not the shutter charge mechanism is stopped at the shutter travel prepared position. If the camera microprocessor 112 determines in step S2750 that the shutter charge mechanism is not located at the shutter travel prepared position, the process advances to step S2770. In this case, since the shutter charge mechanism is not located at the travel prepared position, and it is impossible to travel the shutter, the camera microprocessor 112 displays an error message in step S2770.

If the camera microprocessor 112 determines in step S2750 that the shutter charge mechanism is located at the shutter travel prepared position, the process advances to step S2760. Since the shutter travel preparation of the shutter charge mechanism is complete in step S2760, the camera microprocessor 112 starts a shutter travel waiting timer used to stably travel the shutter, and the process advances to step S2800 to wait until other conditions are met.

In step S2800, the camera microprocessor 112 waits until respective conditions in steps S2515, S2580, S2640, and S2760 are met. When all the conditions are met, the process advances to step S2810. In steps S2810 to S2840, the camera microprocessor 112 executes the same processes as those in steps S1410 to S1440 in FIG. 5D, and the process then advances to steps S2000 and S2100 in FIG. 7A.

Figure 9:
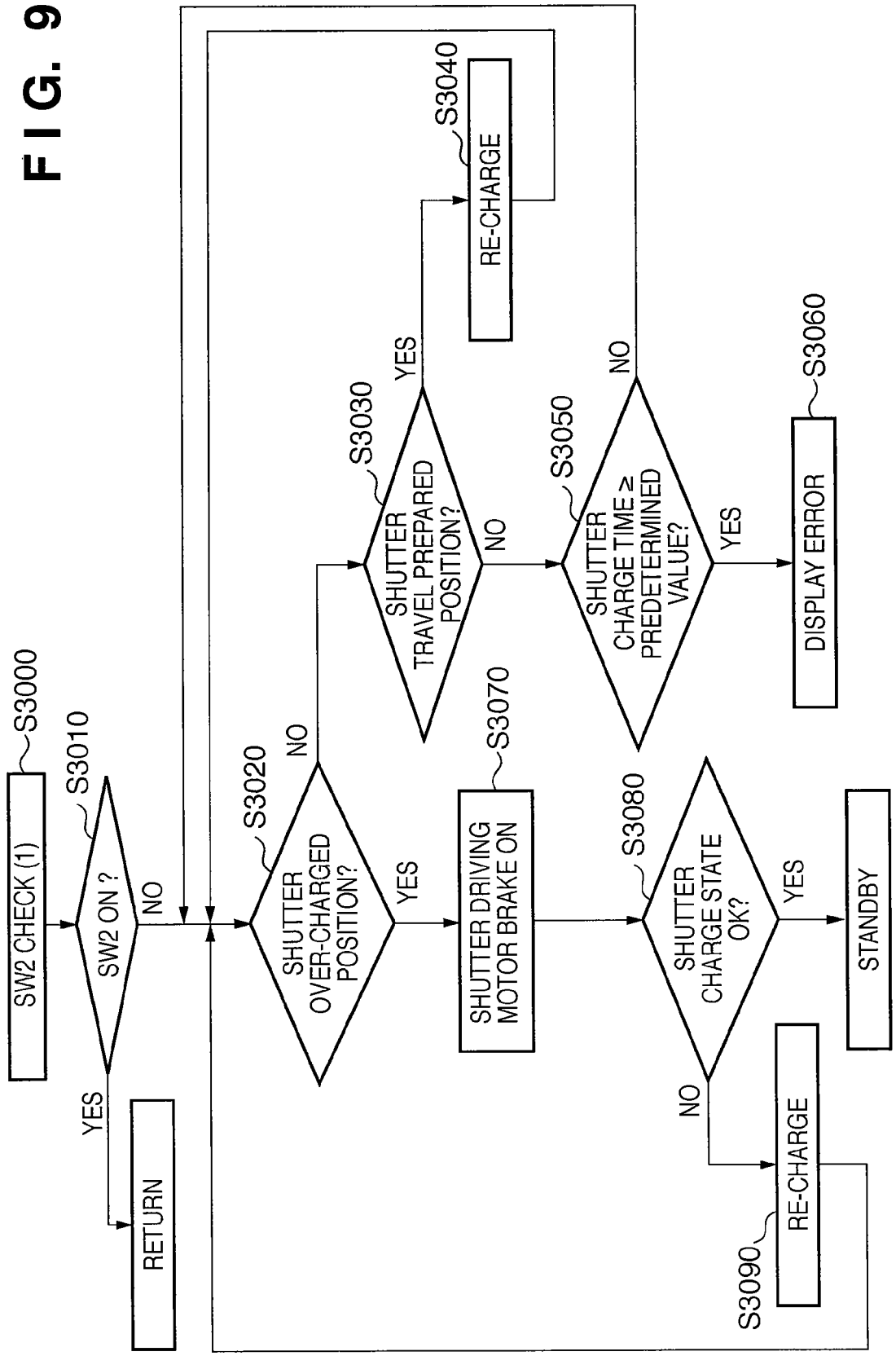
FIG. 9 is a flowchart showing the SW2 check process in step S2160 in FIG. 7A.

The check process of the release switch 15 (SW2) in step S2160 in FIG. 7A will be described below with reference to FIG. 9. Referring to FIG. 9, the camera microprocessor 112 detects an SW2 signal of the release switch 15 in step S3000, and the process advances to step S3010. The camera microprocessor 112 determines in step S3010 whether or not the second release stage signal of the release switch 15 (SW2) is ON. If the camera microprocessor 112 determines in step S3010 that the SW2 signal is ON, the process returns to step S2260 in FIG. 7A.

If the camera microprocessor 112 determines in step S3010 that the second release stage signal is OFF, the process advances to step S3020. The camera microprocessor 112 determines in step S3020 whether or not the charge state of the shutter device 107 is an over-charged position. If the camera microprocessor 112 determines in step S3020 that the charge state of the shutter is not the over-charged state, the process advances to step S3030. The camera microprocessor 112 determines in step S3030 whether or not the charge state of the shutter is a travel prepared position. If the camera microprocessor 112 determines in step S3030 that the charge state of the shutter is the travel prepared position, the process advances to step S3040. In step S3040, the camera microprocessor 112 starts a driving operation to re-charge the shutter, and the process returns to step S3020.

If the camera microprocessor 112 determines in step S3030 that the charge state of the shutter device 107 is not the shutter travel prepared position, the process advances to step S3050. The camera microprocessor 112 determines in step S3050 whether or not the energization time of the shutter driving motor is equal to or larger than a predetermined value. If the camera microprocessor 112 determines in step S3050 that the energization time of the shutter driving motor is not equal to or larger than the predetermined value, the process returns to step S3020. If the camera microprocessor 112 determines in step S3050 that the energization time of the shutter driving motor is equal to or larger than the predetermined value, the process advances to step S3060. In this case, since an arbitrary trouble may have occurred in the shutter charge mechanism, the camera microprocessor 112 stops driving of the shutter driving motor and displays an error message in step S3060.

If the camera microprocessor 112 determines in step S3020 that the charge state of the shutter is the over-charged state, the process advances to step S3070. In step S3070, the camera microprocessor 112 enables braking of the shutter driving motor so as to stop the shutter driving motor, and the process advances to step S3080.

The camera microprocessor 112 determines in step S3080 whether or not the shutter charge mechanism is stopped at an over-charged position. If the camera microprocessor 112 determines in step S3080 that the shutter charge mechanism is not located at the over-charged position, the process advances to step S3090. In this case, since the shutter charge mechanism is not located at the over-charged position, and the shutter charge operation is not complete yet, the camera microprocessor 112 executes a re-charge process in step S3090, and the process returns to step S3020. If the camera microprocessor 112 determines in step S3080 that the shutter charge mechanism is located at the over-charged position, the camera microprocessor 112 sets a standby state.

Figure 10:
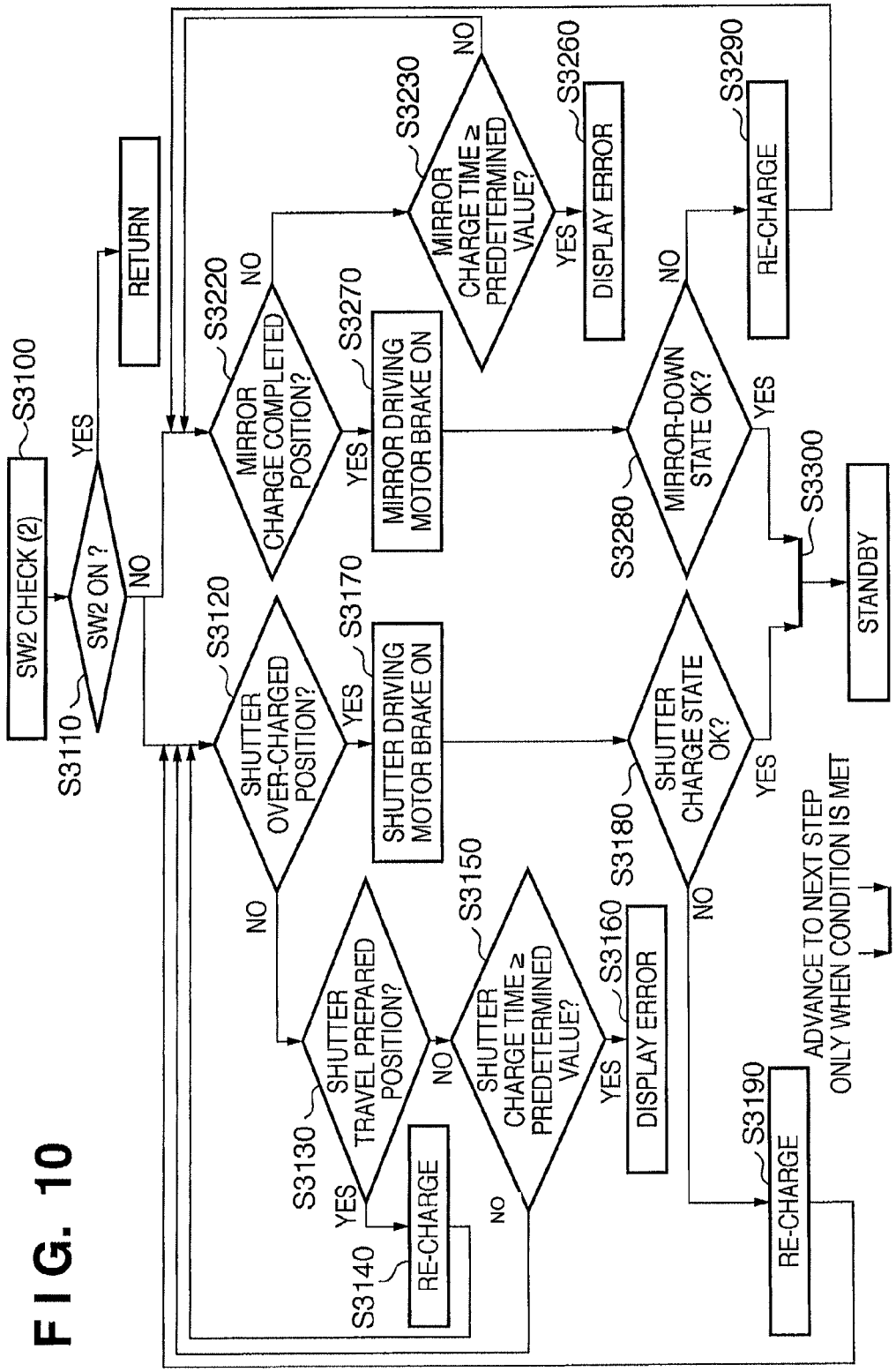
FIG. 10 is a flowchart showing the SW2 check process in step S2380 in FIG. 7B.

The check process of the release switch 15 (SW2) in step S2380 in FIG. 7B will be described below with reference to FIG. 10. Referring to FIG. 10, the camera microprocessor 112 detects an SW2 signal of the release switch 15 in step S3100, and the process advances to step S3110. The camera microprocessor 112 determines in step S3110 if the second release stage signal of the release switch 15 (SW2) is ON. If the camera microprocessor 112 determines in step S3110 that the SW2 signal is ON, the process returns to step S2380 in FIG. 7B.

If the camera microprocessor 112 determines in step S3110 that the second release stage signal is OFF, the process advances to steps S3120 and S3220. The processes in steps S3120 and S3220 are parallelly executed. In steps S3120 to S3190, the camera microprocessor 112 executes the same processes as those in steps S3020 to S3090 in FIG. 9, and the process then advances to step S3300 to wait until other conditions are met.

On the other hand, the camera microprocessor 112 determines in step S3220 whether or not the mirror charge mechanism has reached a mirror charge completed position, that is, to a brake position. If the camera microprocessor 112 determines in step S3220 that the mirror driving motor has not reached the brake position, the process advances to step S3230. The camera microprocessor 112 determines in step S3230 whether or not the energization time of the mirror driving motor is equal to or larger than a predetermined value. If the camera microprocessor 112 determines in step S3230 that the energization time of the mirror driving motor is not equal to or larger than the predetermined value; the process returns to step S3220. If the camera microprocessor 112 determines in step S3230 that the energization time of the mirror driving motor is equal to or larger than the predetermined value, the process advances to step S3260. In this case, since an arbitrary trouble may have occurred in the mirror charge mechanism, the camera microprocessor 112 stops driving of the mirror driving motor and displays an error message in step S3260.

On the other hand, if the camera microprocessor 112 determines in step S3220 that the mirror driving motor has been driven to the brake position, the process advances to step S3270. In step S3270, the camera microprocessor 112 enables braking of the mirror driving motor so as to stop the mirror driving motor, and the process advances to step S3280. In step S3280, the camera microprocessor 112 starts energization to the mirror driving motor, and determines whether or not the mirror driving motor has reached the mirror-down state, that is, to a brake state. If the camera microprocessor 112 determines in step S3280 that the mirror driving motor has not reached the mirror-down state yet, the process advances to step S3290. In this state, since the mirror-down operation is not complete yet in step S3290, the camera microprocessor 112 executes a re-charge process, and the process returns to step S3220. If the camera microprocessor 112 determines in step S3280 that the mirror driving motor has reached the mirror-down state, the camera microprocessor 112 waits until other conditions are met. After respective conditions in steps S3180 and S3280 are met in step S3300, the camera microprocessor 112 sets a standby state.

According to this embodiment, the charge operation of the shutter device is executed depending on whether the image sensing apparatus is set in the single shooting mode or continuous shooting mode. In this way, the reliability upon inadvertent shutter traveling in a waiting state and the stability of an operation of the shutter device after it is left unused can be improved. In the continuous shooting mode, since the shutter charge mechanism is not stopped in the over-charged state, a time from the shutter charge operation until the shutter travel prepared state can be shortened, and the shooting time per frame in the continuous shooting mode can be shortened.

Second Embodiment

Figure 11A:
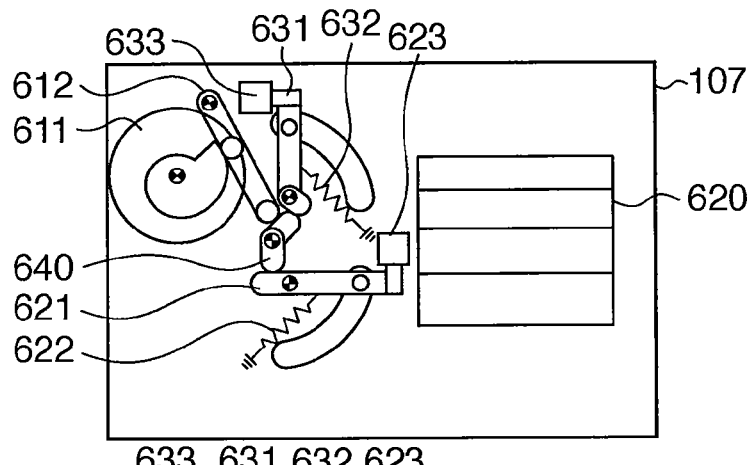
FIGS. 11A to 11D are views showing state changes from a shutter charge operation until a shutter trailing blade travels in the second embodiment.
Figure 11B:
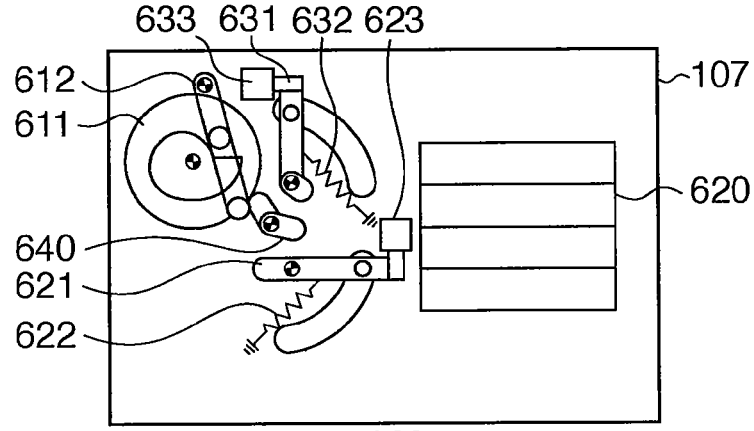
Figure 11C:
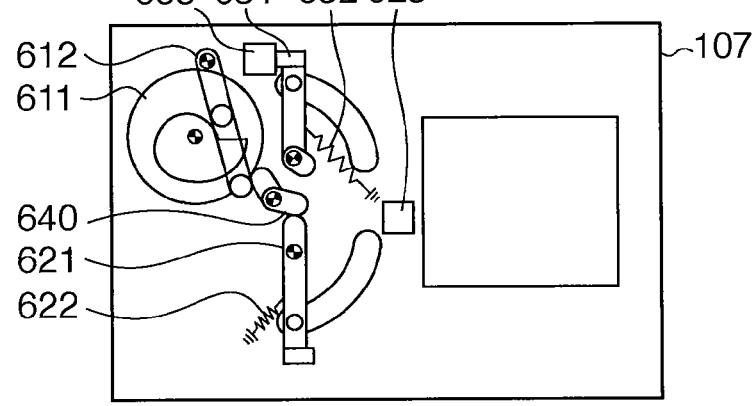
Figure 11D:
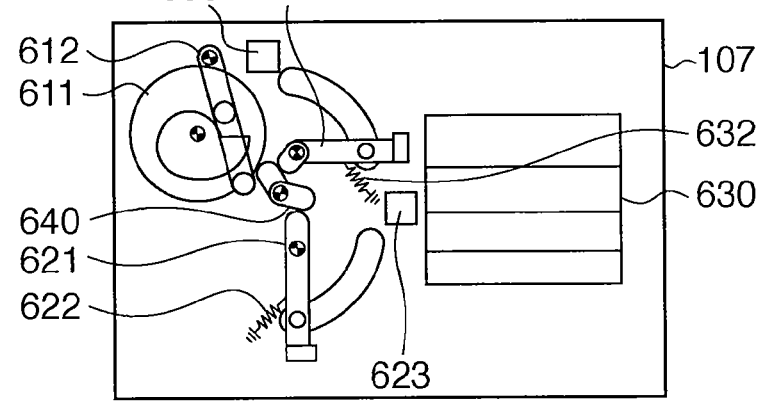

The second embodiment will be described below. In this embodiment, a description of a part common to the first embodiment will not be repeated. The operation of an electromagnetic shutter device 107 according to the second embodiment will be described below. In this electromagnetic shutter device 107, a latch mechanism that retains a shutter blade is electromagnetically driven to release a latched state. FIG. 11A shows an over-charged state in which a charge operation of the shutter device is complete. FIG. 11B shows a travel prepared state in which the over-charged state of the shutter device is released, and the latch mechanism retains a shutter leading blade group 620 and shutter trailing blade group 630. FIG. 11C shows an exposure state in which the shutter leading blade group 620 traveled, and FIG. 11D shows a travel completed state in which the shutter trailing blade group 630 traveled.

Referring to FIGS. 11A to 11C, reference numeral 611 denotes a cam gear which is used to perform a shutter charge operation, and is driven by a shutter driving motor (not shown). Reference numeral 612 denotes a charge lever, on which a cam follower that traces a cam formed on the cam gear 611 is formed. The cam gear 611 and charge lever 612 form a charge member. Reference numeral 620 denotes a shutter leading blade group which closes a shutter opening before exposure, and forms a shutter member. Reference numeral 621 denotes a shutter leading blade driving lever which engages with the shutter leading blade group 620 to drive it. Reference numeral 622 denotes a shutter leading blade driving spring. When the shutter leading blade driving spring 622 urges the shutter leading blade driving lever 621, the shutter leading blade group 620 is driven. Reference numeral 623 denotes a shutter leading blade latch electromagnet. The shutter leading blade latch electromagnet 623 retains the shutter leading blade driving lever 621 at a travel prepared position.

Reference numeral 630 denotes a shutter trailing blade group which closes the shutter opening after exposure, and forms the shutter member. Reference numeral 631 denotes a shutter trailing blade driving lever which engages with the shutter trailing blade group 630 to drive it. Reference numeral 632 denotes a shutter trailing blade driving spring. When the shutter trailing blade driving spring 632 urges the shutter trailing blade driving lever 631, the shutter trailing blade group 630 is driven. Reference numeral 633 denotes a shutter trailing blade latch electromagnet. The shutter trailing blade latch electromagnet 633 retains the shutter trailing blade driving lever 631 at a travel prepared position. Reference numeral 640 denotes a cam lever which is used to charge the shutter leading blade driving lever 621 and shutter trailing blade driving lever 631, and is driven by the charge lever 612. In the above arrangement, the cam gear 611, charge lever 612, and cam lever 640 form a shutter charge mechanism. The shutter leading blade latch electromagnet 623 and shutter trailing blade latch electromagnet 633 form a latch mechanism.

In FIG. 11A, when the charge lever 612 is lifted to a cam top position of the cam gear 611, the cam lever 640 sets the shutter leading blade driving lever 621 and shutter trailing blade driving lever 631 in the over-charged state. At this time, the shutter leading blade driving lever 621 and shutter trailing blade driving lever 631 are retained by the cam lever 640 without energizing the shutter leading blade latch electromagnet 623 and shutter trailing blade latch electromagnet 633.

FIG. 11B shows a state in which the over-charged state by the cam lever 640 is released, and a travel prepared state is set. In this travel prepared state, energization to the shutter leading blade latch electromagnet 623 and shutter trailing blade latch electromagnet 633 is started before the charged state by the cam lever 640 is released. Therefore, even after the charged state by the cam lever 640 is released, the shutter leading blade driving lever 621 and shutter trailing blade driving lever 631 are retained in the travel prepared state.

FIG. 11C shows a state during exposure in which the shutter leading blade group 620 traveled. In this exposure state, the energization to the shutter leading blade latch electromagnet 623 is cut off to remove the retaining force of the shutter leading blade latch electromagnet 623. Thus, the shutter leading blade driving lever 621 is driven by the urging force of the shutter leading blade driving spring 622, and the shutter leading blade group 620 travels.

In FIG. 11D, the energization to the shutter trailing blade latch electromagnet 633 is cut off to remove the retaining force of the shutter trailing blade latch electromagnet 633. Thus, the shutter trailing blade driving lever 631 is driven by the urging force of the shutter trailing blade driving spring 632, and the shutter trailing blade group 630 travels.

In this embodiment as well, when the user sets a mode such as a single shooting mode other than a continuous shooting mode at a setting unit 16, the shutter device 107 is stopped to be set in the over-charged state in FIG. 11A. Then, in response to a shutter release operation, the over-charged state is released while the shutter leading blade latch electromagnet 623 and shutter trailing blade latch electromagnet 633 are energized, as shown in FIG. 11B. Then, the shutter leading blade latch electromagnet 623 and shutter trailing blade latch electromagnet 633 retain the shutter leading blade driving lever 621 and shutter trailing blade driving lever 631. For this reason, the shutter blade can be prevented from inadvertently traveling.

When the user sets the continuous shooting mode at the setting unit 16, the shutter device is not stopped in the over-charged state in FIG. 11A when a shutter charge operation is executed again after the shutter leading blade group 620 and shutter trailing blade group 630 travel in FIGS. 11C and 11D, but it is driven at once to the travel prepared state in which the over-charged state is released, as shown in FIG. 11B. Thus, the operations under a variety of power supply conditions and environmental conditions are stabilized.

A shooting operation according to this embodiment will be described below with reference to the flowcharts shown in FIGS. 12A-12D. Note that a camera microprocessor 112 executes the following processes unless otherwise specified. Note that in steps S4000, S4010, S4050, S4060, and S4070 shown in FIG. 12A, the camera microprocessor 112 executes the same processes as those in steps S1000, S1020, S1050, S1060, and S1070 in FIG. 5A. In this embodiment, after step S4010, the process advances to step S4020, and the camera microprocessor 112 starts energization to the electromagnets 623 and 633 as the latch mechanism. Then, the process advances to steps S4030 and S4050. That is, the shutter device 107 of this embodiment is configured so that the shutter leading blade latch electromagnet 623 and shutter trailing blade latch electromagnet 633 are energized in advance, and their energization is cut off to remove their attracting forces in a shutter travel operation, thus traveling the shutter blade.

Figure 5B:
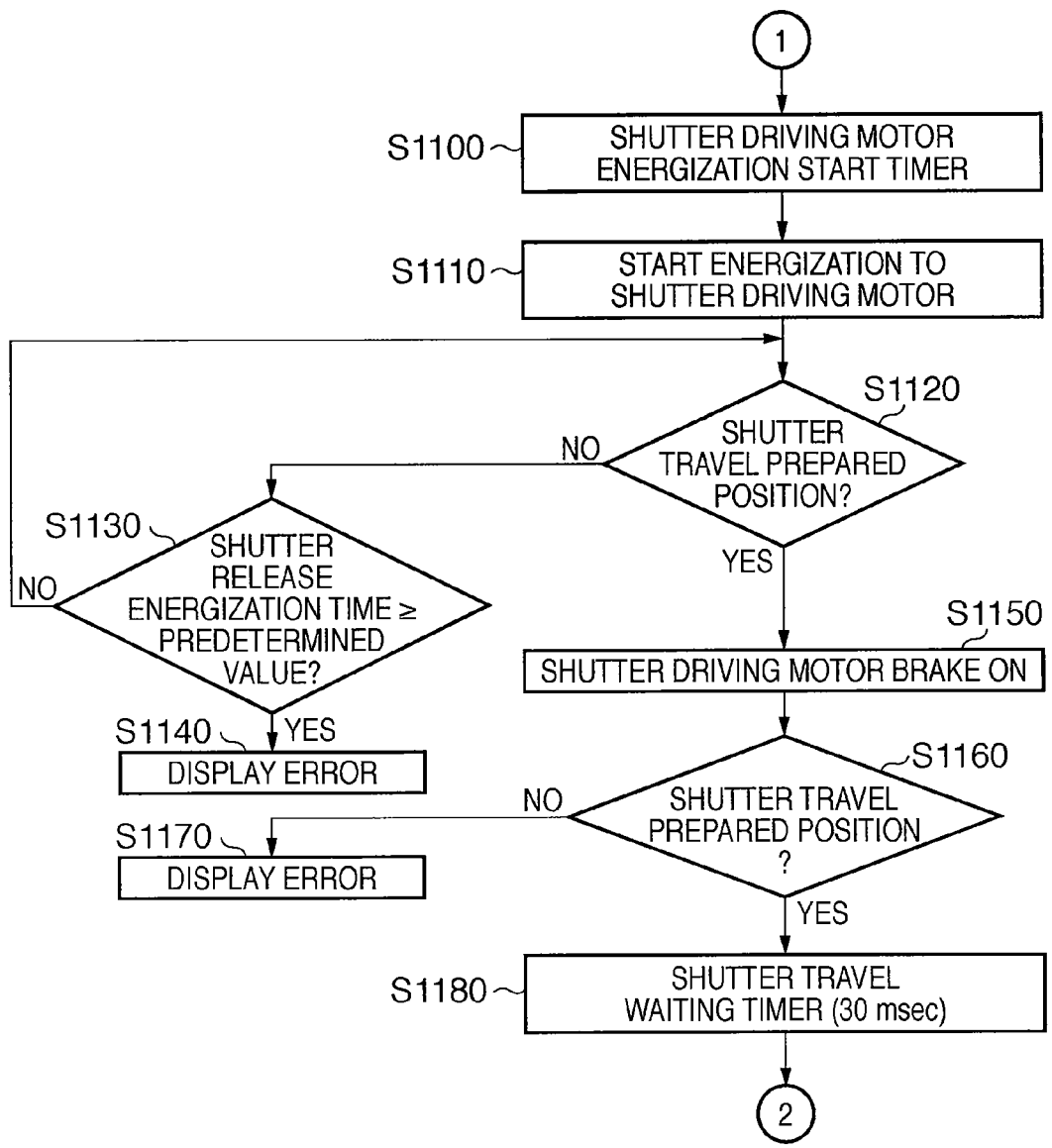
Figure 5C:
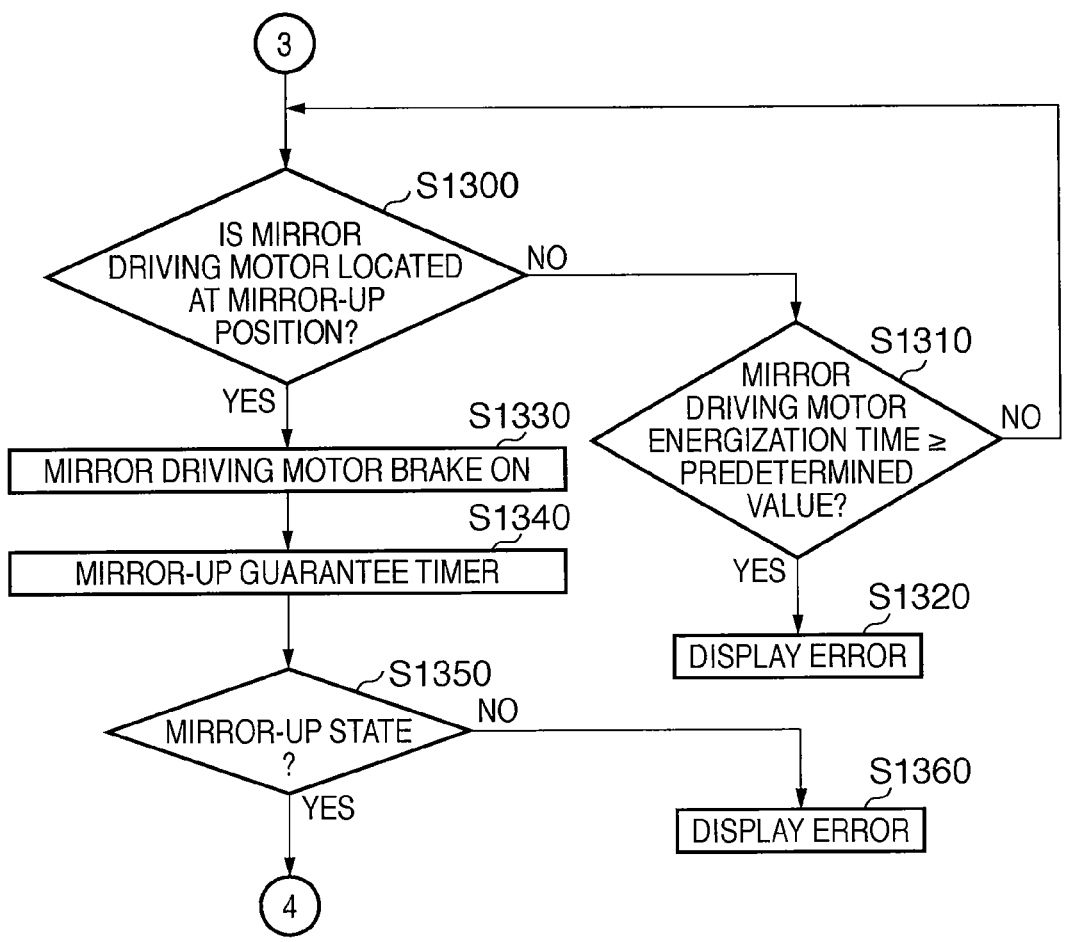
Figure 12A:
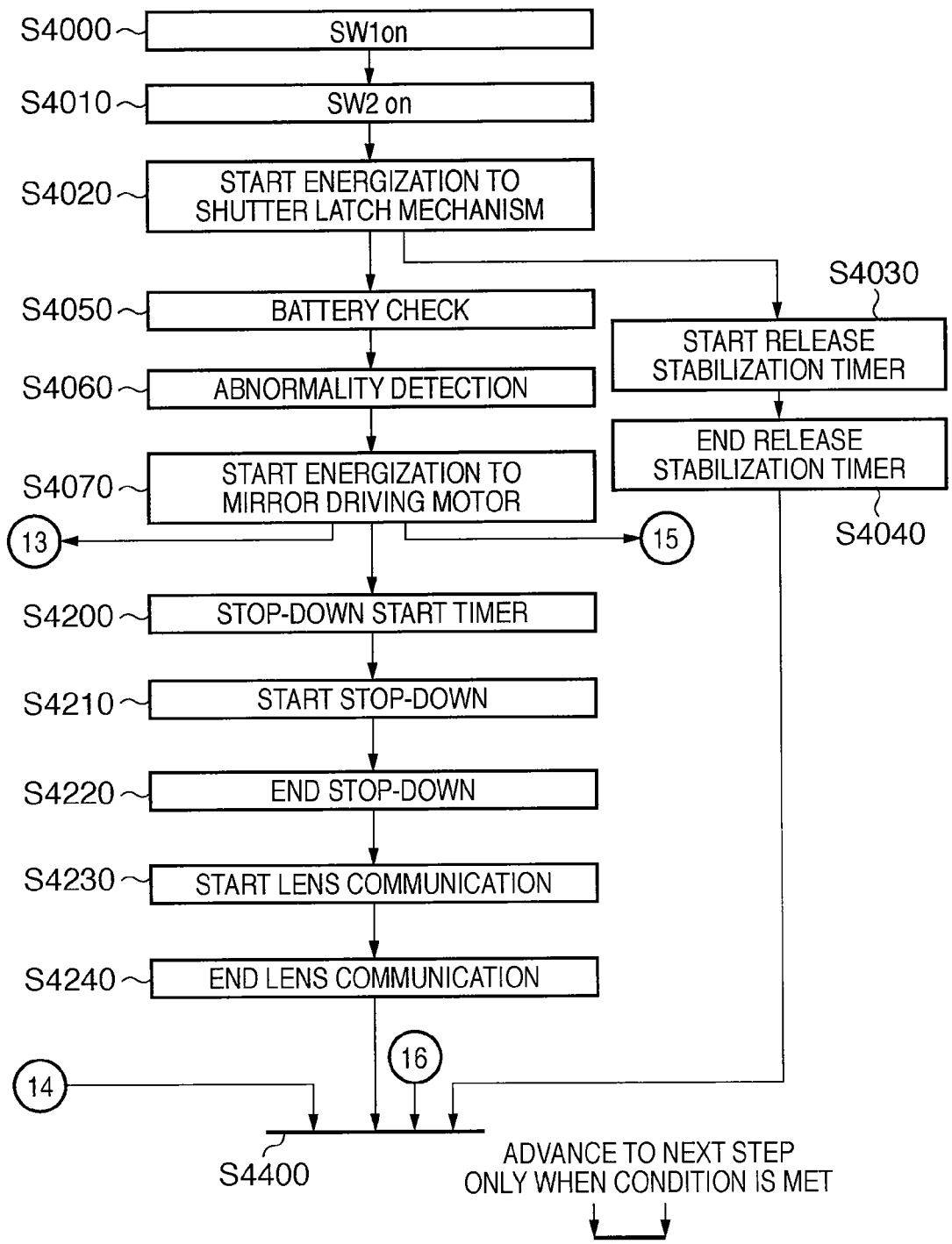
FIGS. 12A to 12D are flowcharts showing operations from a shutter release operation until an exposure operation of an image sensing apparatus according to the second embodiment.
Figure 12B:
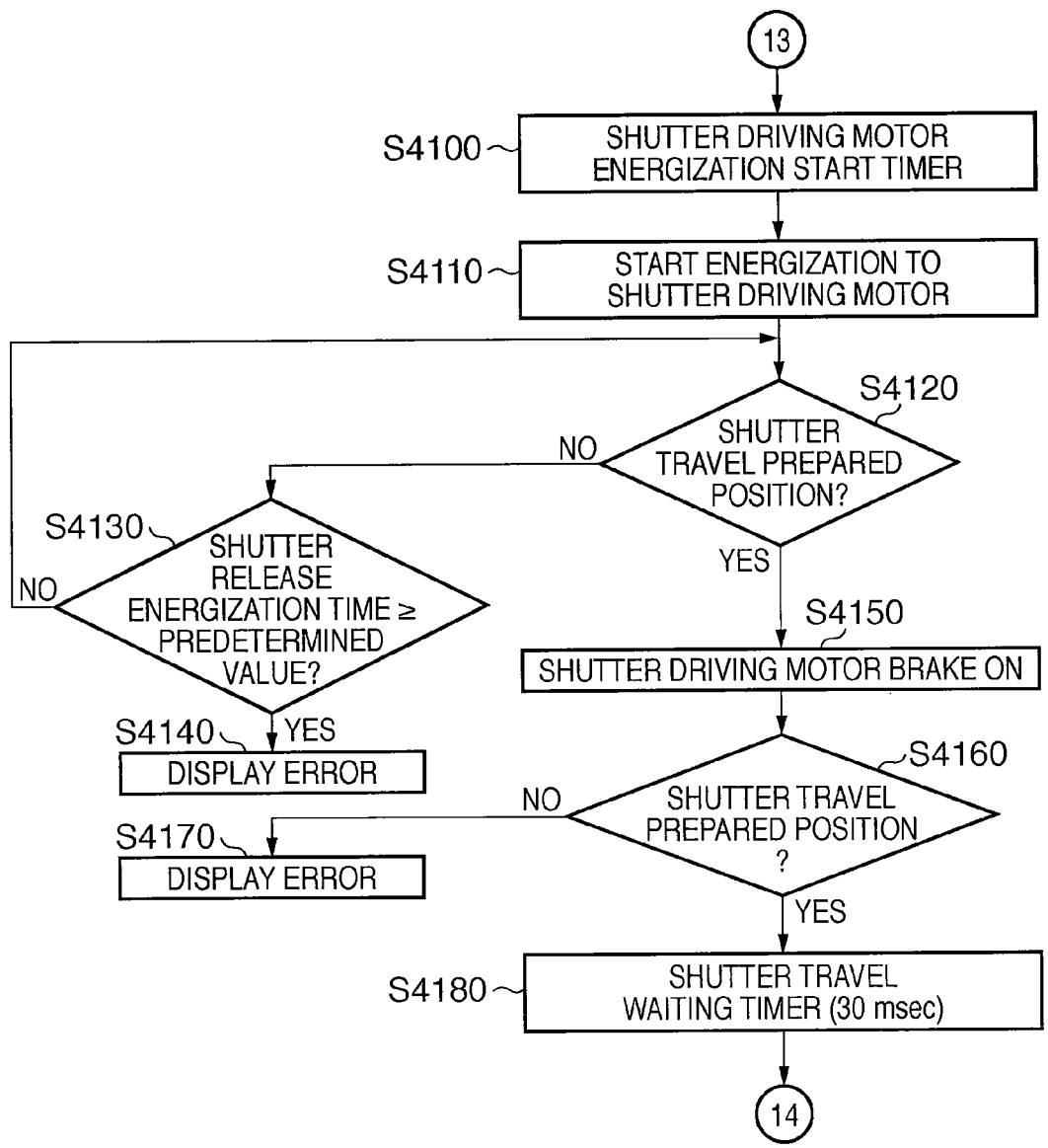
Figure 12C:
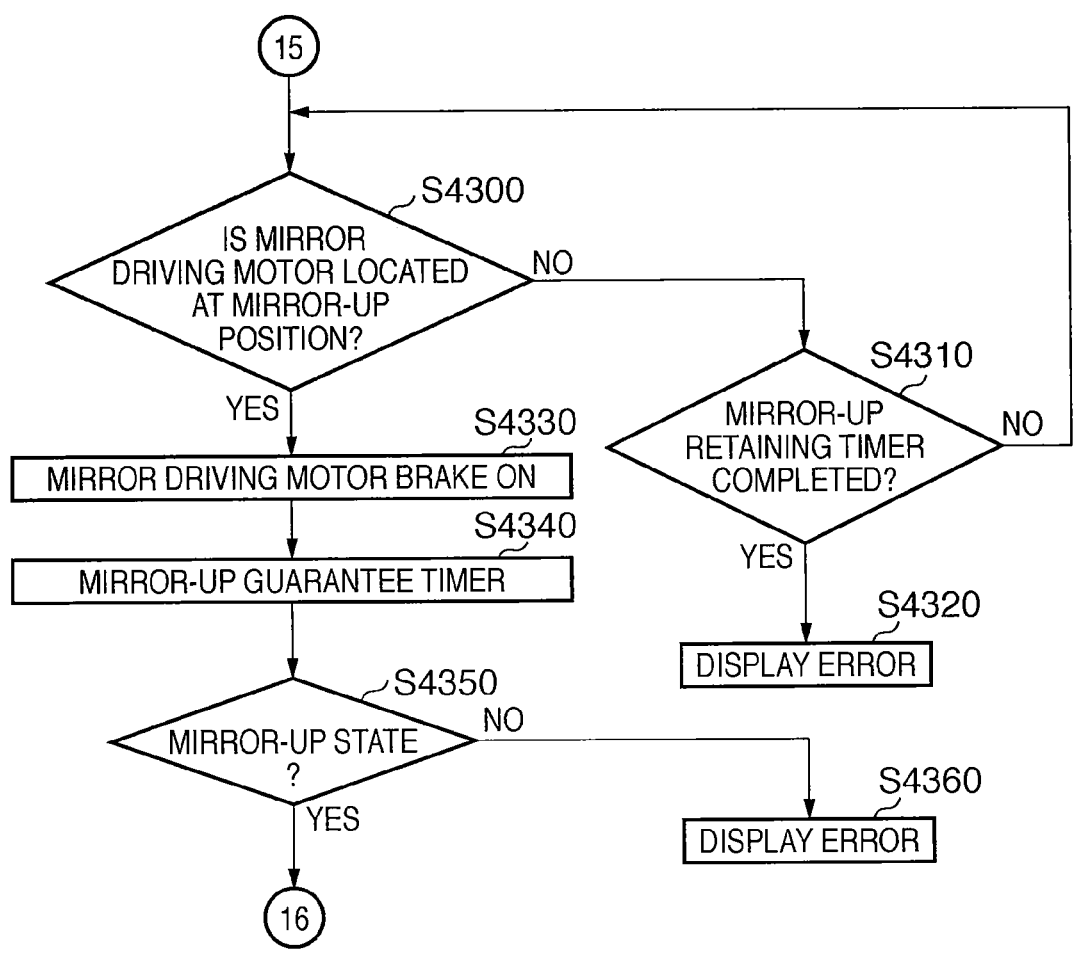
Figure 12D:
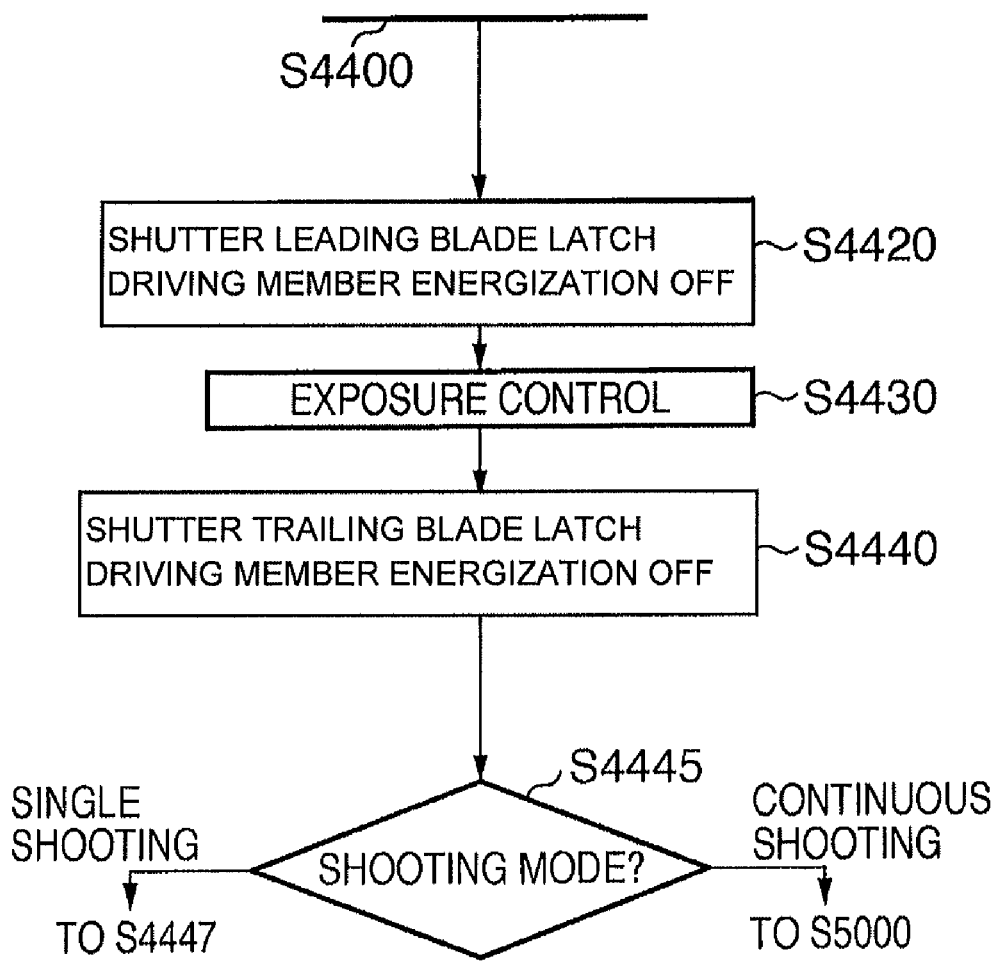

Also, in steps S4100 to S4180 shown in FIG. 12B, the camera microprocessor 112 executes the same processes as those in steps S1100 to S1180 shown in FIG. 5B. Also, in steps S4200 to S4240 in FIG. 12A and steps S4300 to S4360 (except for step S4310) shown in FIG. 12C, the camera microprocessor 112 executes the same processes as those in steps S1200 to S1240 in FIG. 5A and steps S1300 to S1360 (except for step S1310) shown in FIG. 5C. Furthermore, in steps S4030 and S4040 shown in FIG. 12A, the camera microprocessor 112 executes the same processes as those in steps S1030 and S1040 shown in FIG. 5A. Note that the camera microprocessor 112 determines in step S4310 whether or not a mirror-up retaining timer has reached a time-out.

Furthermore, in step S4440, the camera microprocessor 112 waits until respective conditions in steps S4180, S4240, S4350, and S4040 are met. When all the conditions are met, the process advances to step S4420. In step S4420, the camera microprocessor 112 cuts off energization to the shutter leading blade latch electromagnet 623 to start traveling of the shutter leading blade group 620. The process then advances to step S4430. In step S4430, the camera microprocessor 112 measures a time until start of traveling of the shutter trailing blade group 630 based on an exposure control value, and the process advances to step S4440. In step S4440, the camera microprocessor 112 cuts off energization to the shutter trailing blade latch electromagnet 633 to start traveling of the shutter trailing blade group 630, and the process then advances to step S4445.

Figure 5D:
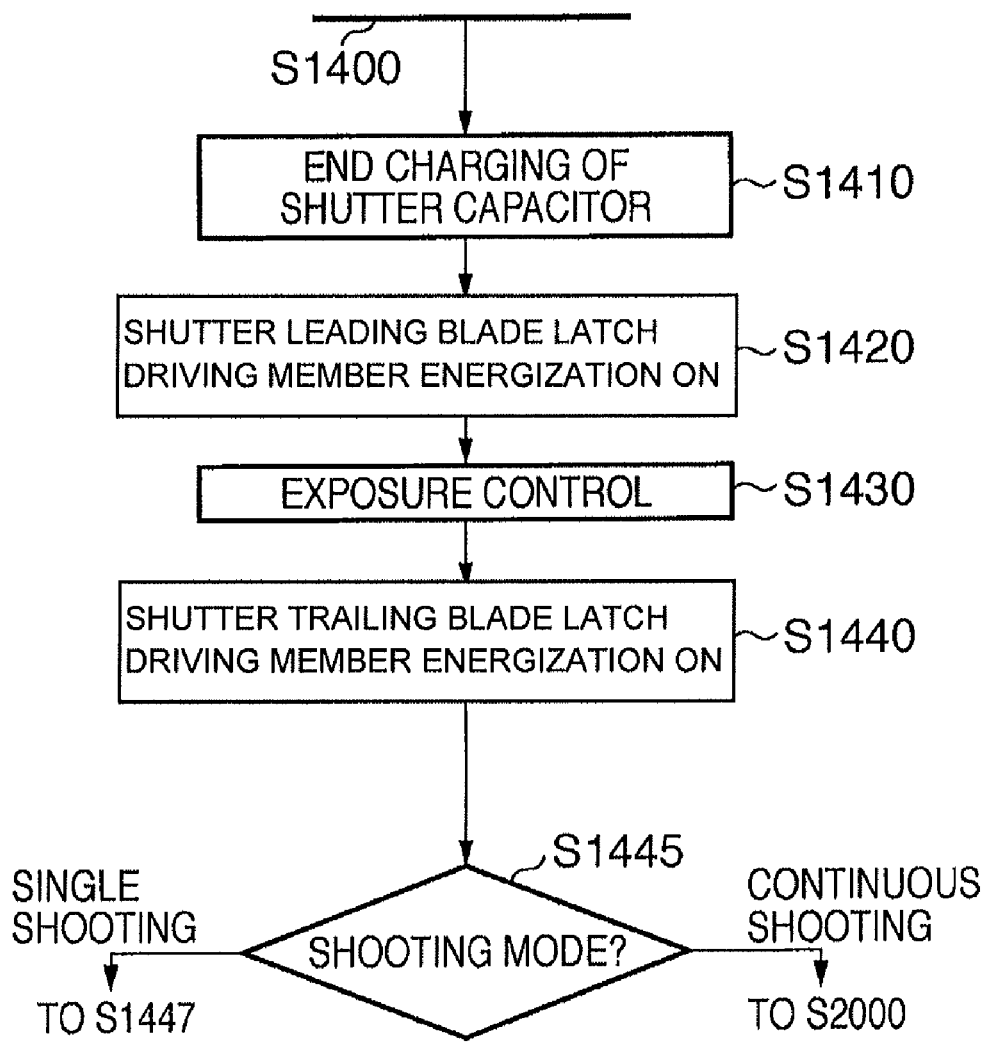
Figure 6B:
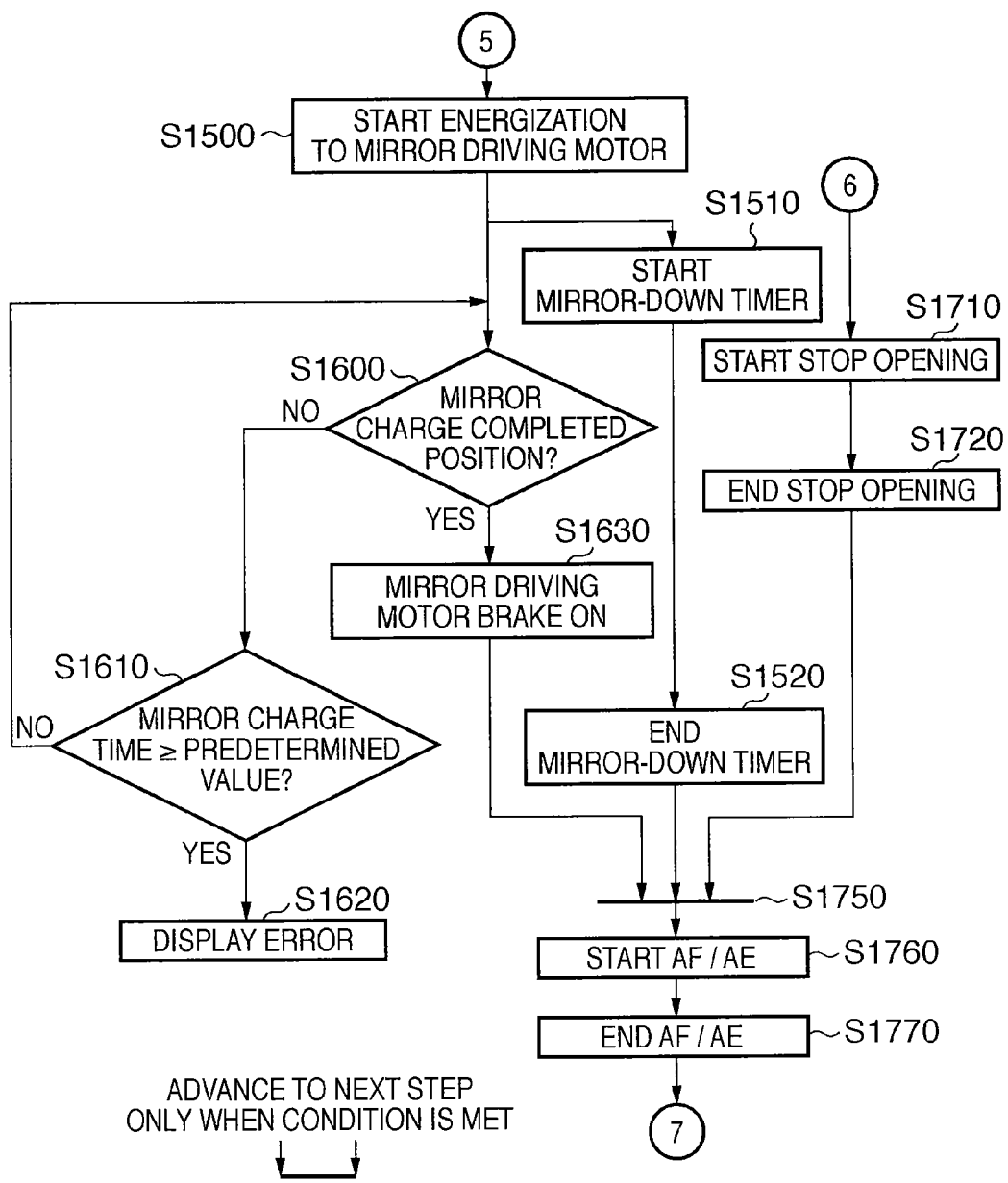
Figure 6C:
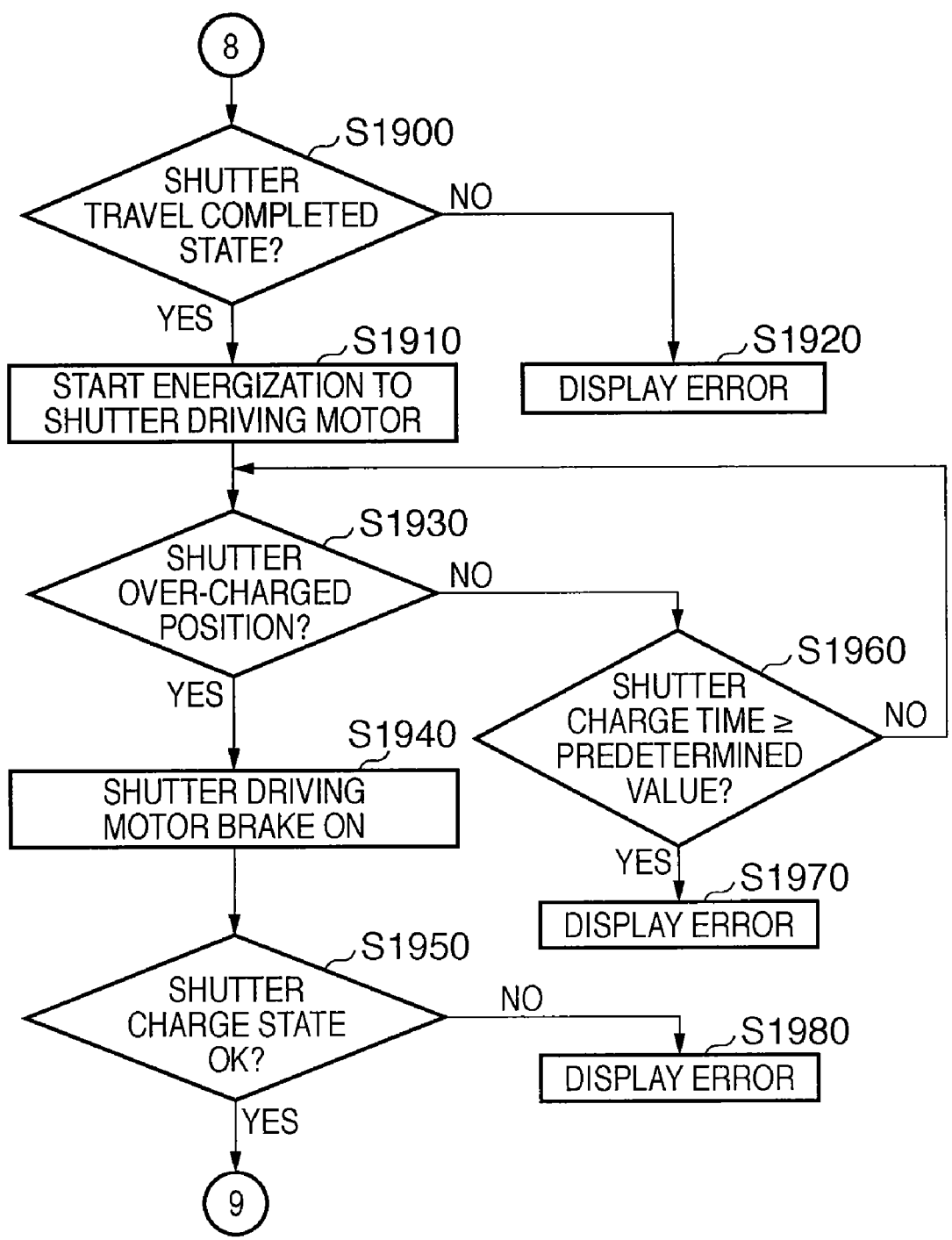

As in step S1445 in FIG. 5D, the camera microprocessor 112 determines in step S4445 whether the operation mode of an image sensing apparatus 100 is the single shooting mode or continuous shooting mode. If the single shooting mode is set, the process advances to step S4447 shown in FIG. 13A (to be described later); if the continuous shooting mode is set, the process advances to step S5000 shown in FIG. 14A (to be described later).

Figure 13A:
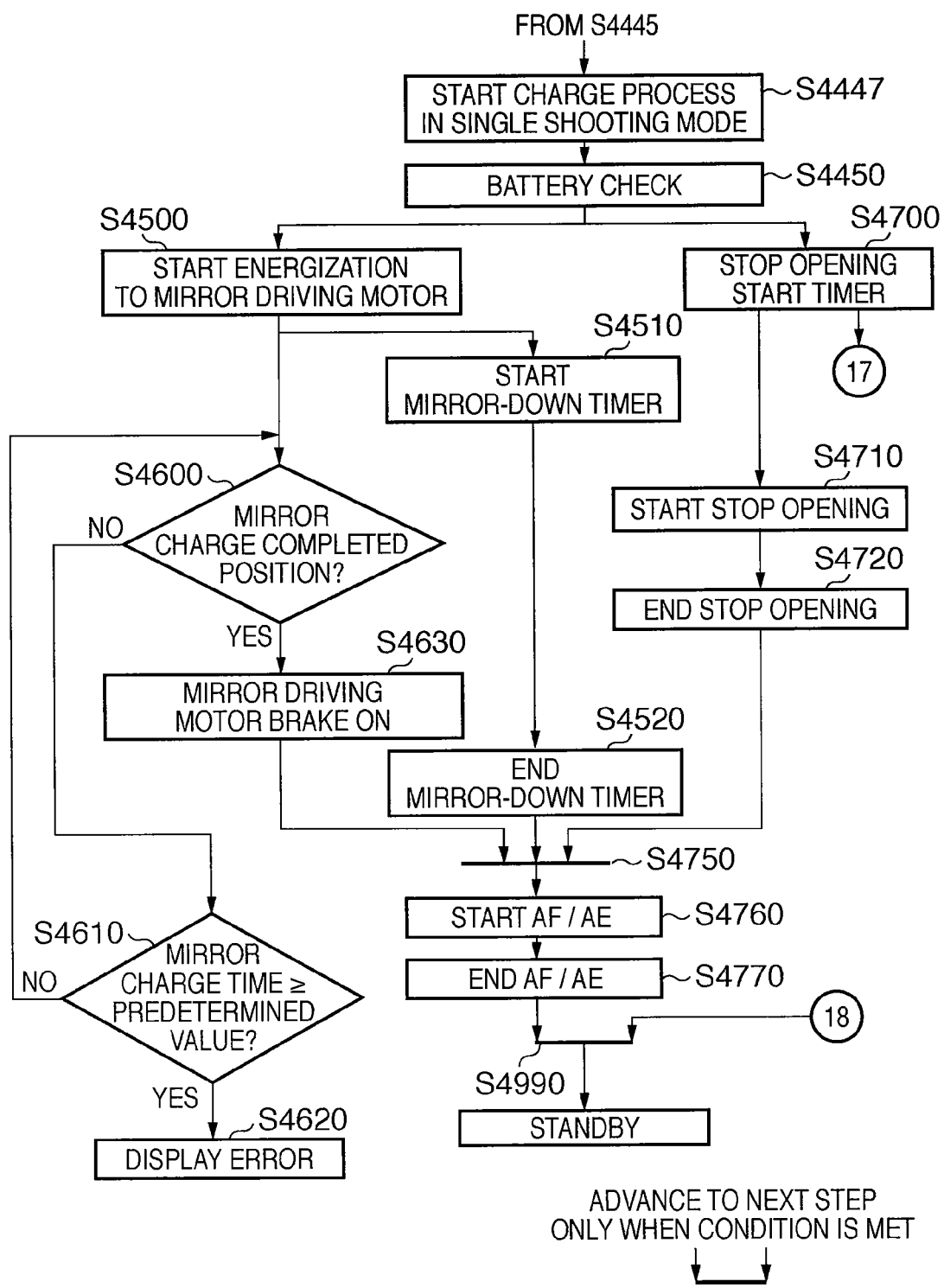
FIGS. 13A and 13B are flowcharts showing operations from the shutter release operation until the exposure operation of the image sensing apparatus according to the second embodiment.
Figure 13B:
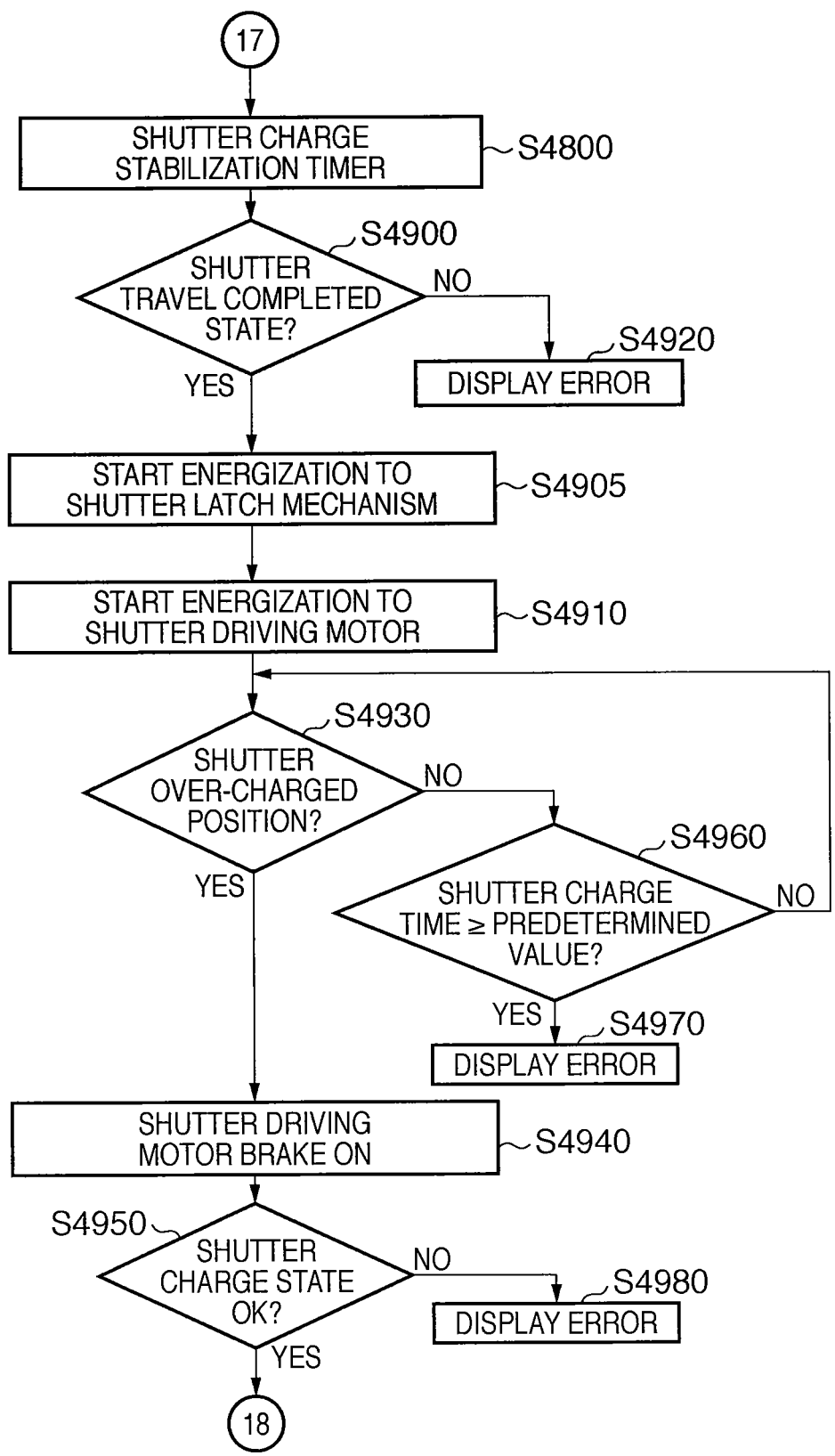

In steps S4447, S4450, and S4500 to S4770 shown in FIG. 13A, the camera microprocessor 112 executes the same processes as those in steps S1447, S1450, and S1500 to S1770 shown in FIG. 6B. Also, in steps S4700 to S4720 shown in FIG. 13A, the camera microprocessor 112 executes the same processes as those in steps S1700 to S1720 shown in FIGS. 6A and 6B. Furthermore, in steps S4800 to S4980 shown in FIG. 13B, the camera microprocessor 112 executes the same processes as those in steps S1800 to S1980 (except for steps S1810 and S1820) shown in FIGS. 6A and 6C. Unlike in FIG. 5D, the processes in steps S1810 and S1820 are not included, and after a shutter travel completed state is set in step S4900, the process advances to step S4905. In step S4905, the camera microprocessor 112 starts energization to the shutter leading blade latch electromagnet 623 and shutter trailing blade latch electromagnet 633, and the process advances to step S4910. In step S4990, the camera microprocessor 112 waits until respective conditions in steps S4770 and S4950 are met. When all the conditions are met, the camera microprocessor 112 sets a standby state.

Figure 14A:
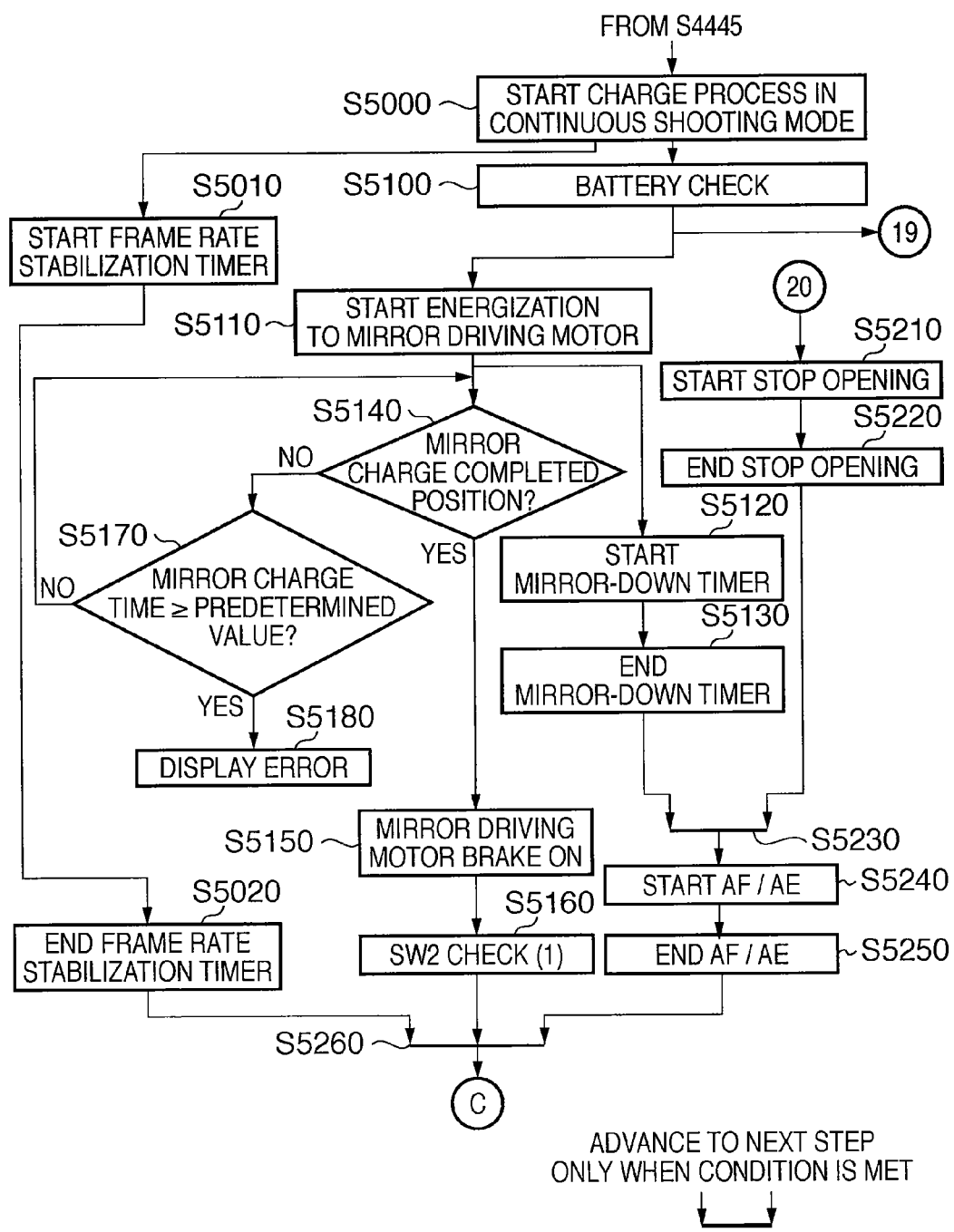
FIGS. 14A and 14B are flowcharts showing operations from the shutter release operation until the exposure operation of the image sensing apparatus according to the second embodiment.
Figure 14B:
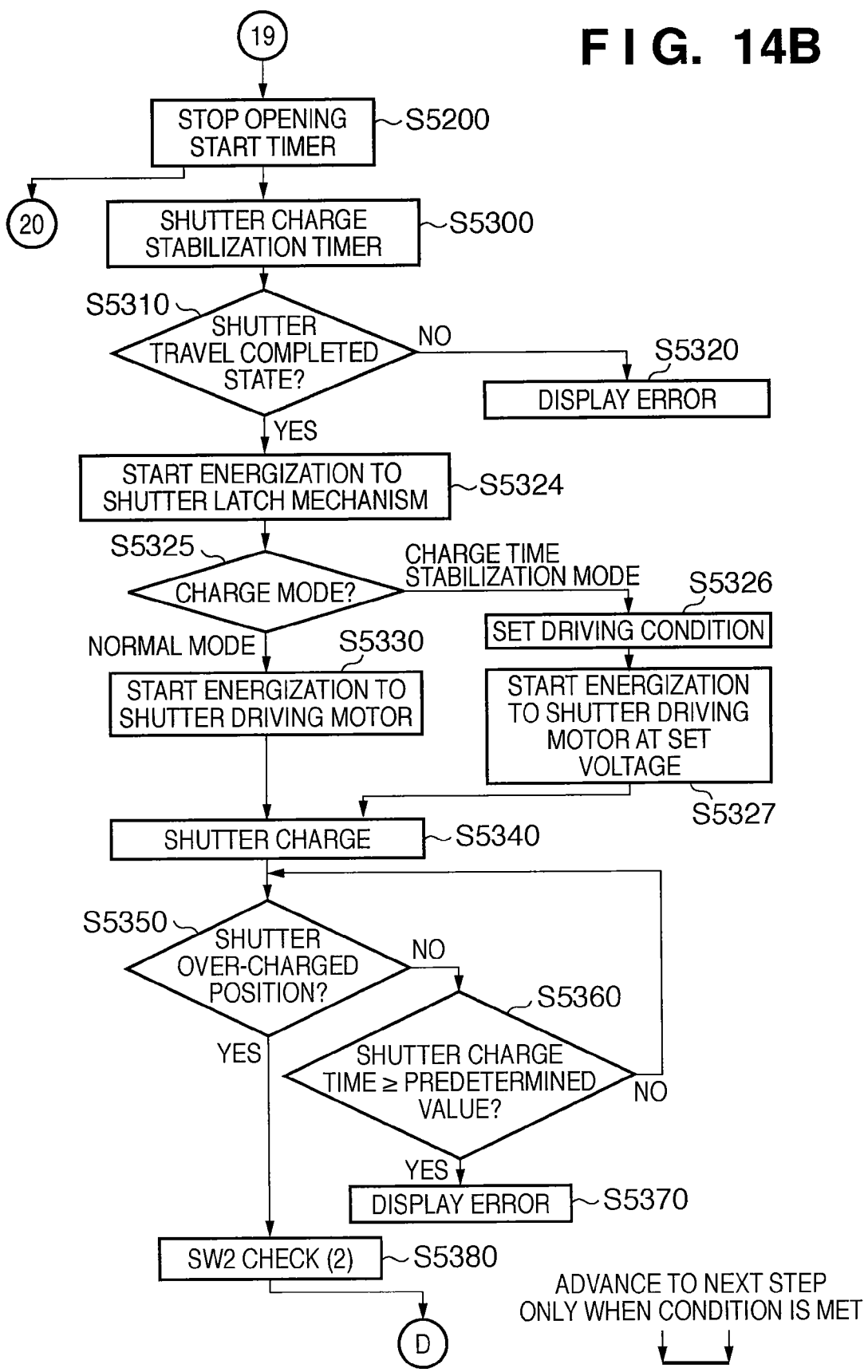

In steps S5000 to S5380 shown in FIGS. 14A and 14B, the camera microprocessor 112 executes the same processes as those in steps S2000 to S2380 shown in FIGS. 7A and 7B. Unlike in FIG. 7B, the processes in steps S2400 and S2410 are not included, and after a shutter travel completed state is set in step S5310, the process advances to step S5325 via step S5324. In step S5324, the camera microprocessor 112 starts energization to the shutter leading blade latch electromagnet 623 and shutter trailing blade latch electromagnet 633, and the process then advances to step S5325.

Figure 15A:
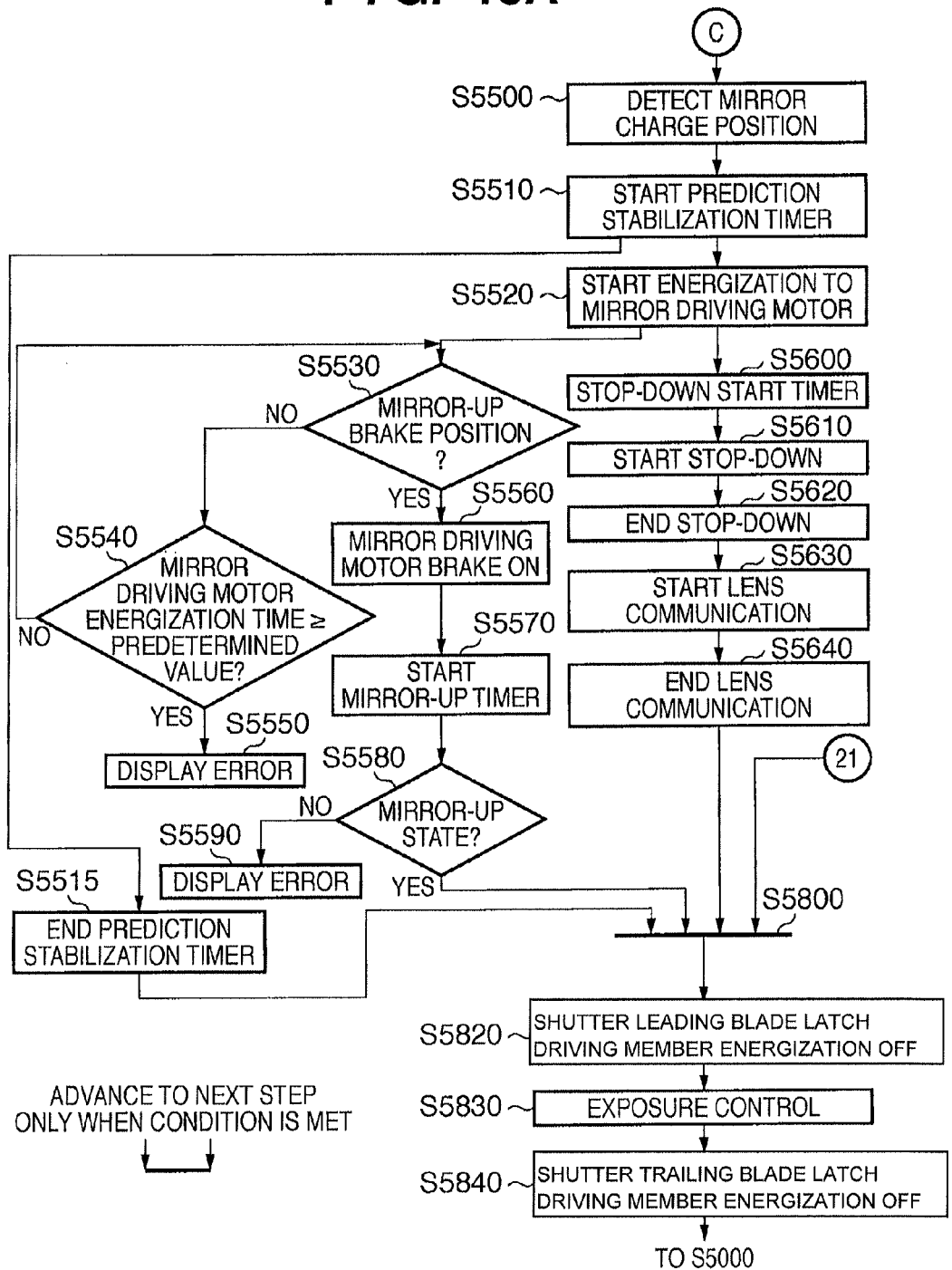
FIGS. 15A and 15B are flowcharts showing operations from the shutter release operation until the exposure operation of the image sensing apparatus according to the second embodiment.
Figure 15B:
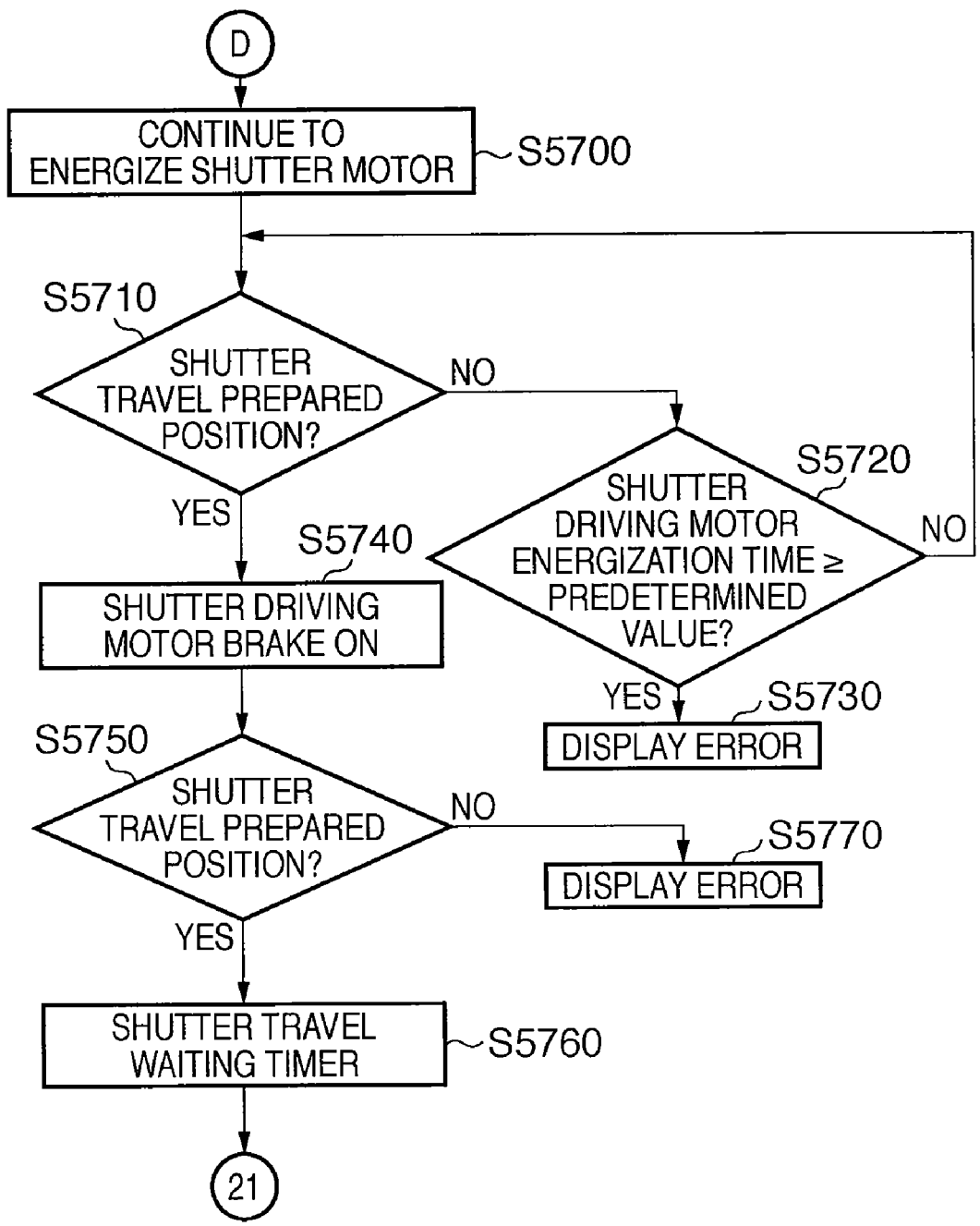

In step S5260, the camera microprocessor 112 waits until respective conditions in steps S5020, S5160, and S5250 are met. When all the conditions are met, the process advances to step S5500 in FIG. 15A. In steps S5500 to S5800 shown in FIG. 15A, the camera microprocessor 112 executes the same processes as those in steps S2500 to S2800 shown in FIG. 8A.

Unlike in FIG. 8A, when all conditions are met in step S5800, the process advances to step S5820. In step S5820, the camera microprocessor 112 cuts off energization to the shutter leading blade latch electromagnet 623 to start traveling of the shutter leading blade group 620. The process then advances to step S5830. In step S5830, the camera microprocessor 112 measures a time until start of traveling of the shutter trailing blade group 630 based on an exposure control value, and the process advances to step S5840. In step S5840, the camera microprocessor 112 cuts off energization to the shutter trailing blade latch electromagnet 633 to start traveling of the shutter trailing blade group 630. After that, the process advances to step S5000 shown in FIG. 14A.

According to this embodiment, since the charge operation of the shutter device is executed according to the shooting mode of the image sensing apparatus, the reliability upon inadvertent shutter traveling in a waiting state and the stability of an operation of the shutter device after it is left unused can be improved. In the continuous shooting mode, since the shutter charge mechanism is not stopped in the over-charged state, a time from the shutter charge operation until the shutter travel prepared state can be shortened, and the shooting time per frame in the continuous shooting mode can be shortened.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-201082, filed Aug. 31, 2009 which is hereby incorporated by reference herein in its entirety.

What is claimed is:

1. An image sensing apparatus which is capable of executing a continuous shooting operation, comprising:
a shutter driving member which drives a shutter blade;
a shutter spring which urges said shutter driving member;
a shutter charge unit which charges said shutter spring, said shutter charge unit being switched between a charged state in which said shutter driving member is retained while said shutter spring is charged after a charge operation of said shutter spring is complete, and a travel prepared state in which said shutter driving member is not retained;
a driving unit which drives said shutter charge unit;
a retaining unit which, when said shutter charge unit is set in the travel prepared state, retains said shutter driving member in a state in which said shutter spring is charged;
a determination unit which determines whether or not said image sensing apparatus is executing the continuous shooting operation; and
a control unit which, when said determination unit determines that said image sensing apparatus is executing the continuous shooting operation, controls said driving unit to drive said shutter charge unit to the travel prepared state without stopping said shutter charge unit in the charged state after the charge operation of said shutter spring is complete.

2. The apparatus according to claim 1, wherein when said determination unit determines that said image sensing apparatus is not executing the continuous shooting operation, said control unit controls said driving unit to stop said shutter charge unit in the charged state after the charge operation of said shutter spring is complete.

3. An image sensing apparatus, which comprises a continuous shooting mode in which a shooting operation is continuously executed while a switch used to instruct to start the shooting operation is kept ON, said apparatus comprising:
a shutter driving member which drives a shutter blade;
a shutter spring which urges said shutter driving member;
a shutter charge unit which charges said shutter spring, said shutter charge unit being switched between a charged state in which said shutter driving member is retained while said shutter spring is charged after a charge operation of said shutter spring is complete, and a travel prepared state in which said shutter driving member is not retained;
a driving unit which drives said shutter charge unit;
a retaining unit which, when said shutter charge unit is set in the travel prepared state, retains said shutter driving member in a state in which said shutter spring is charged;
a first determination unit which determines whether or not the continuous shooting mode is set;
a second determination unit which determines whether or not the switch is ON; and
a control unit which, when said first determination unit determines that the continuous shooting mode is set, and said second determination unit determines that the switch is ON, controls said driving unit to drive said shutter charge unit to the travel prepared state without stopping said shutter charge unit in the charged state after the charge operation of said shutter spring is complete.

4. The apparatus according to claim 3, wherein when said first determination unit determines that the continuous shooting mode is not set, said control unit controls said driving unit to stop said shutter charge unit in the charged state after the charge operation of said shutter spring is complete.

5. The apparatus according to claim 3, wherein when said first determination unit determines that the continuous shooting mode is set, and said second determination unit determines that the switch is not ON, said control unit controls said driving unit to stop said shutter charge unit in the charged state after the charge operation of said shutter spring is complete.

6. The apparatus according to claim 5, wherein when said second determination unit determines that the switch is ON after said control unit controls said driving unit to stop said shutter charge unit in the charged state, said control unit controls said driving unit to drive said shutter charge unit from the charged state to the travel prepared state.

7. The apparatus according to claim 3, further comprising:
a detection unit which detects that said shutter charge unit is set in the charged state,
wherein when said detection unit detects that said shutter charge unit is set in the charged state, said second determination unit determines whether or not the switch is ON.

8. A control method of an image sensing apparatus which is capable of executing a continuous shooting operation, comprising:
a shutter driving member which drives a shutter blade;
a shutter spring which urges the shutter driving member;
a shutter charge unit which charges the shutter spring, the shutter charge unit being switched between a charged state in which the shutter driving member is retained while the shutter spring is charged after a charge operation of the shutter spring is complete, and a travel prepared state in which said shutter driving member is not retained;
a driving unit which drives the shutter charge unit; and
a retaining unit which, when the shutter charge unit is set in the travel prepared state, retain the shutter driving member in a state in which the shutter spring is charged, the method comprising:
a determination step of determining whether or not the image sensing apparatus is executing the continuous shooting operation; and
a control step of controlling, when it is determined in the determination step that the image sensing apparatus is executing the continuous shooting operation, the driving unit to drive the shutter charge unit to the travel prepared state without stopping the shutter charge unit in the charged state after the charge operation of the shutter spring is complete.

9. The method according to claim 8, wherein in the control step, when it is determined in the determination step that the image sensing apparatus is not executing the continuous shooting operation, the driving unit is controlled to stop the shutter charge unit in the charged state after the charge operation of the shutter spring is complete.

10. A control method of an image sensing apparatus, which comprises a continuous shooting mode in which a shooting operation is continuously executed while a switch used to instruct to start the shooting operation is kept ON, comprising:
a shutter driving member which drives a shutter blade;
a shutter spring which urges the shutter driving member;
a shutter charge unit which charges the shutter spring, the shutter charge unit being switched between a charged state in which the shutter driving member is retained while the shutter spring is charged after a charge operation of the shutter spring is complete, and a travel prepared state in which said shutter driving member is not retained;
a driving unit which drives the shutter charge unit; and
a retaining unit which, when the shutter charge unit is set in the travel prepared state, retains the shutter driving member in a state in which the shutter spring is charged, the method comprising:
a first determination step of determining whether or not the continuous shooting mode is set;
a second determination step of determining whether or not the switch is ON; and
a control step of controlling, when it is determined in the first determination step that the continuous shooting mode is set, and it is determined in the second determination step that the switch is ON, the driving unit to drive the shutter charge unit to the travel prepared state without stopping the shutter charge unit in the charged state after the charge operation of the shutter spring is complete.

11. The method according to claim 10, wherein in the control step, when it is determined in the first determination step that the continuous shooting mode is not set, the driving unit is controlled to stop the shutter charge unit in the charged state after the charge operation of the shutter spring is complete.

12. The method according to claim 10, wherein in the control step, when it is determined in the first determination step that the continuous shooting mode is set, and it is determined in the second determination step that the switch is not ON, the driving unit is controlled to stop the shutter charge unit in the charged state after the charge operation of the shutter spring is complete.

13. The method according to claim 12, wherein in the control step, when it is determined in the second determination step that the switch is ON after the driving unit is controlled to stop the shutter charge unit in the charged state, the driving unit is controlled to drive the shutter charge unit from the charged state to the travel prepared state.

14. The method according to claim 10, further comprising:
a detection step of detecting that the shutter charge unit is set in the charged state,
wherein when it is detected in the detection step that the shutter charge unit is set in the charged state, it is determined in the second determination step whether or not the switch is ON.

* * * * *